US012657641B2

(12) United States Patent
Briones et al.

(10) Patent No.: US 12,657,641 B2
(45) Date of Patent: Jun. 16, 2026

(54) AUTOMATED WAIVER REQUEST PROCESSING FOR DRONE OPERATION

(71) Applicant: FAAVIATOR LLC, Sebastopol, CA (US)

(72) Inventors: John Aurelio Briones, Sebastopol, CA (US); Deborah Marie Briones, Sebastopol, CA (US)

(73) Assignee: FAAVIATOR, LLC, Sebastopol, CA (US)

( * ) Notice: Subject to any disclaimer, the term of this patent is extended or adjusted under 35 U.S.C. 154(b) by 122 days.

(21) Appl. No.: 18/911,027

(22) Filed: Oct. 9, 2024

(65) Prior Publication Data

US 2025/0124531 A1 Apr. 17, 2025

Related U.S. Application Data

(60) Provisional application No. 63/544,612, filed on Oct. 17, 2023.

(51) Int. Cl.
*G06Q 50/26* (2024.01)
*H04W 4/029* (2018.01)

(52) U.S. Cl.
CPC ............ *G06Q 50/26* (2013.01); *H04W 4/029* (2018.02)

(58) Field of Classification Search
None
See application file for complete search history.

(56) References Cited

U.S. PATENT DOCUMENTS

| | | | | |
|---|---|---|---|---|
| 10,841,734 B2 * | 11/2020 | Jones | ...................... | H04L 67/02 |
| 11,847,923 B2 * | 12/2023 | Maloney | .............. | G07C 5/0808 |
| 2016/0358432 A1 * | 12/2016 | Branscomb | ........ | G08B 13/1965 |
| 2019/0130770 A1 * | 5/2019 | Di Benedetto | .......... | G08G 5/32 |
| 2020/0265726 A1 * | 8/2020 | Dupray | .................... | G08G 5/25 |
| 2020/0310408 A1 * | 10/2020 | Carper | ................. | G01C 21/165 |
| 2020/0336860 A1 * | 10/2020 | Jones | .................... | H04W 68/00 |
| 2021/0312817 A1 * | 10/2021 | Stewart | ................... | G08G 5/22 |
| 2022/0084420 A1 * | 3/2022 | Borgyos | .................. | G08G 5/22 |
| 2022/0101736 A1 * | 3/2022 | Maloney | .............. | G07C 5/0808 |
| 2022/0150572 A1 * | 5/2022 | Chang | ................. | G06F 3/04847 |
| 2023/0064248 A1 | 3/2023 | Priest | | |
| 2025/0326474 A1 * | 10/2025 | Rajendran | .............. | B63C 9/082 |

OTHER PUBLICATIONS

UASidekick—The Ultimate UAS Pilot Assistant (retrieved on Dec. 10, 2024 from https://uasidekick.com/), 4 pages.

* cited by examiner

*Primary Examiner* — Shelley Chen
(74) *Attorney, Agent, or Firm* — Raubvogel Law Office

(57) ABSTRACT

According to various embodiments, the process of requesting and obtaining waivers and/or permits for drone operation, particularly in emergency situations, is automated and simplified. The described techniques therefore allow for timelier processing of such requests, thereby potentially saving lives and/or property. A user completes fields for a waiver request via an electronic device. Field values may be saved, refilled, and/or auto-filled as appropriate. In at least one embodiment, a back-end system receives the submitted request and communicates directly with a Federal Aviation Administration (FAA) system operations support center (SOSC) for immediate approval of the request. In this manner, accuracy is improved, redundancy is removed, and application processing is made more efficient and timely.

48 Claims, 20 Drawing Sheets

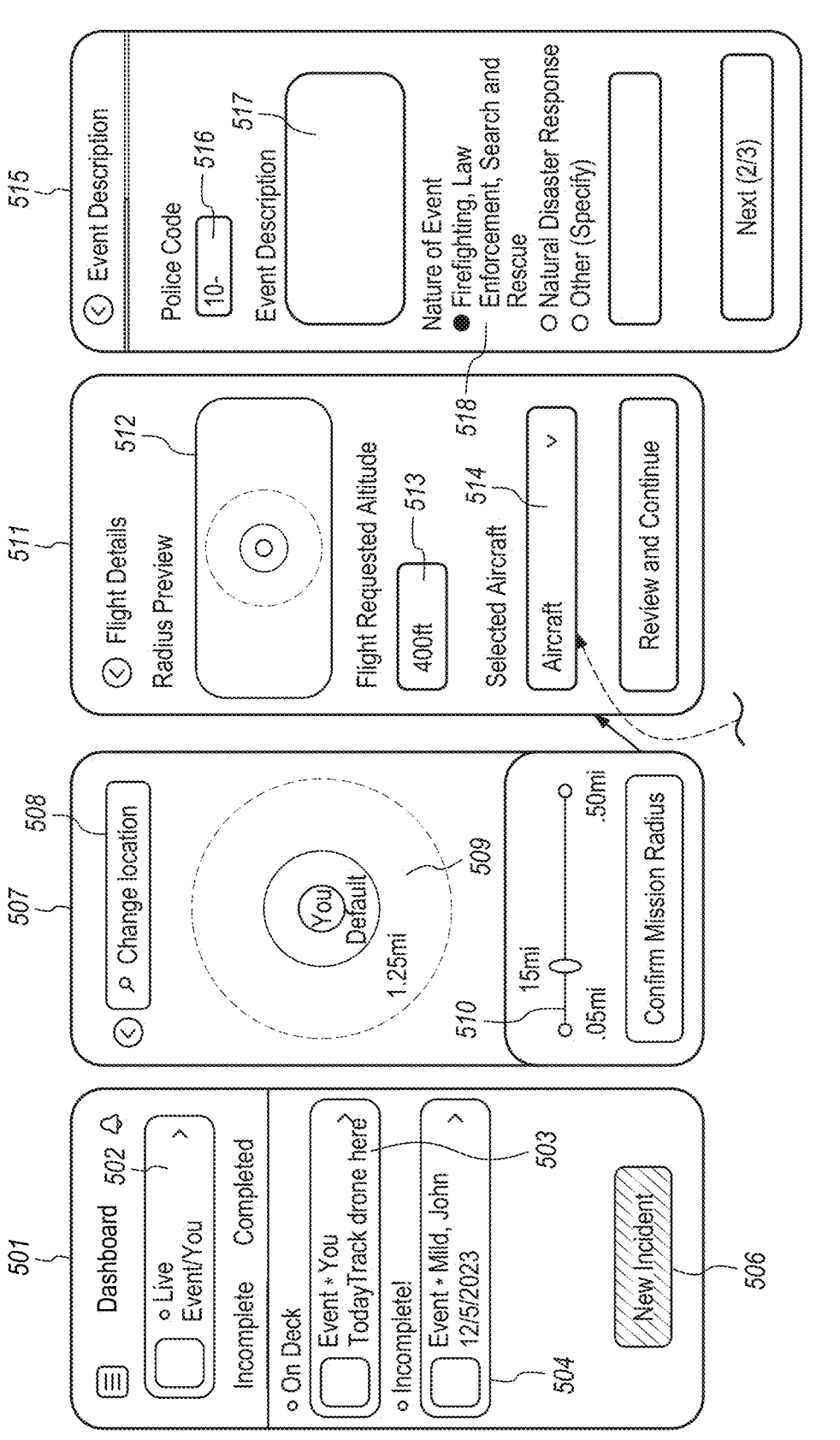
*FIG. 5A1*

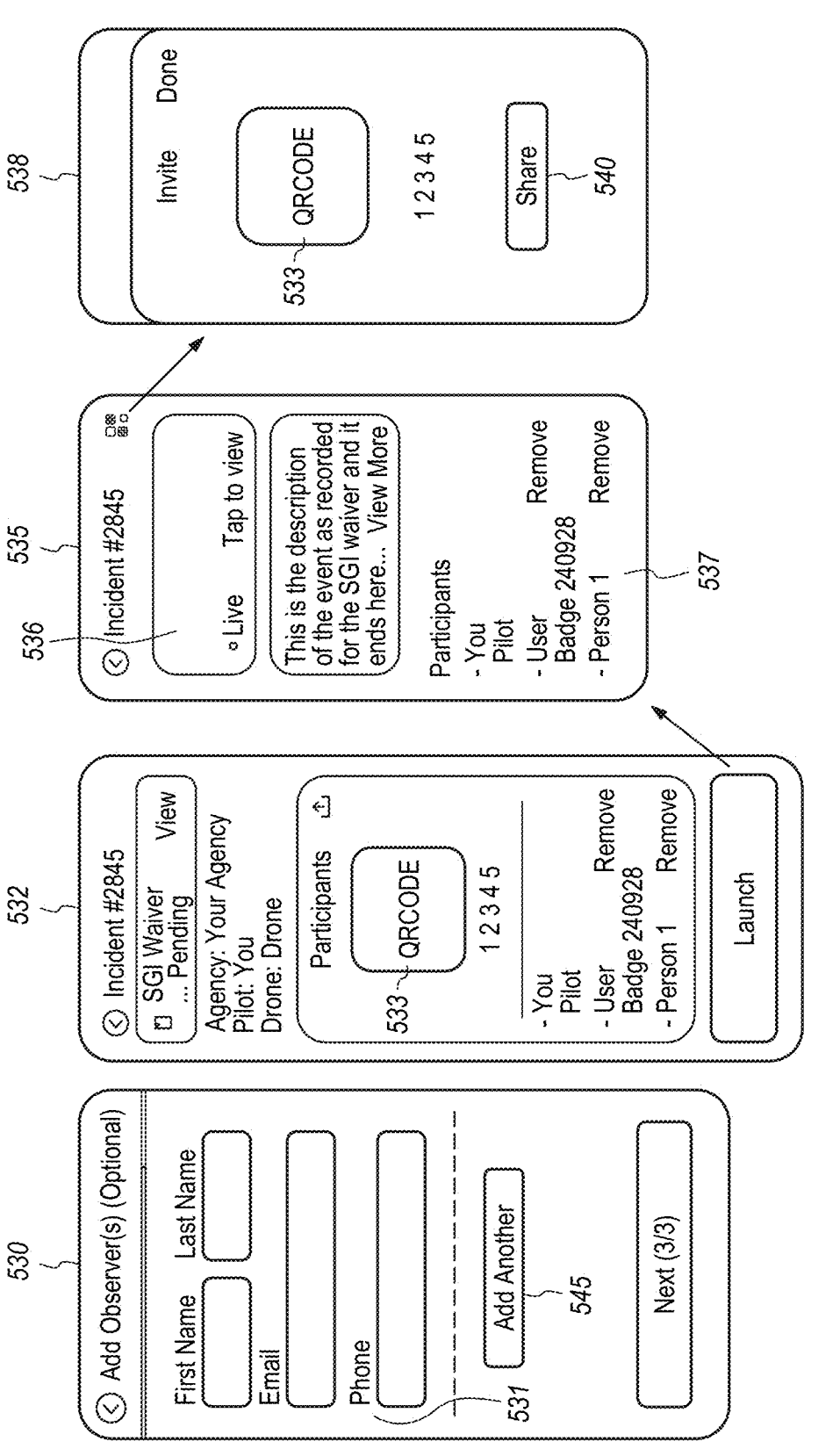
*FIG. 5B1*

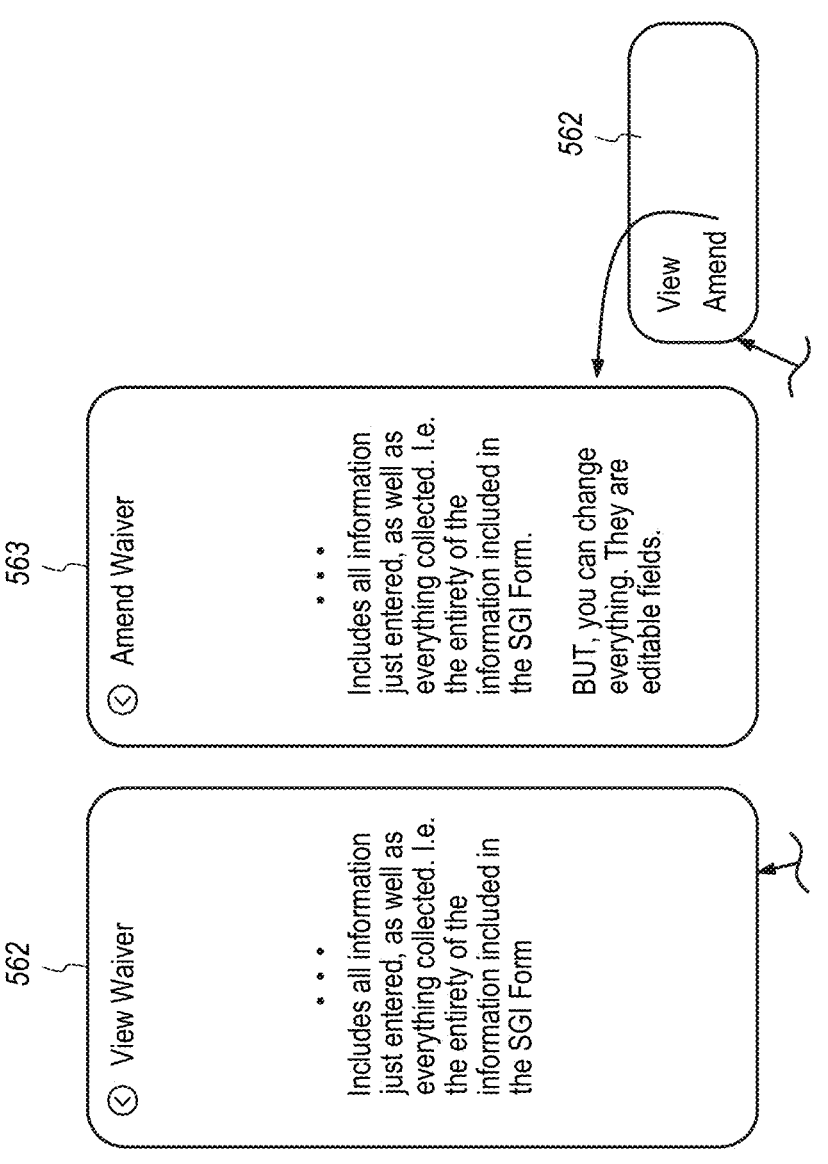
*FIG. 5C1*

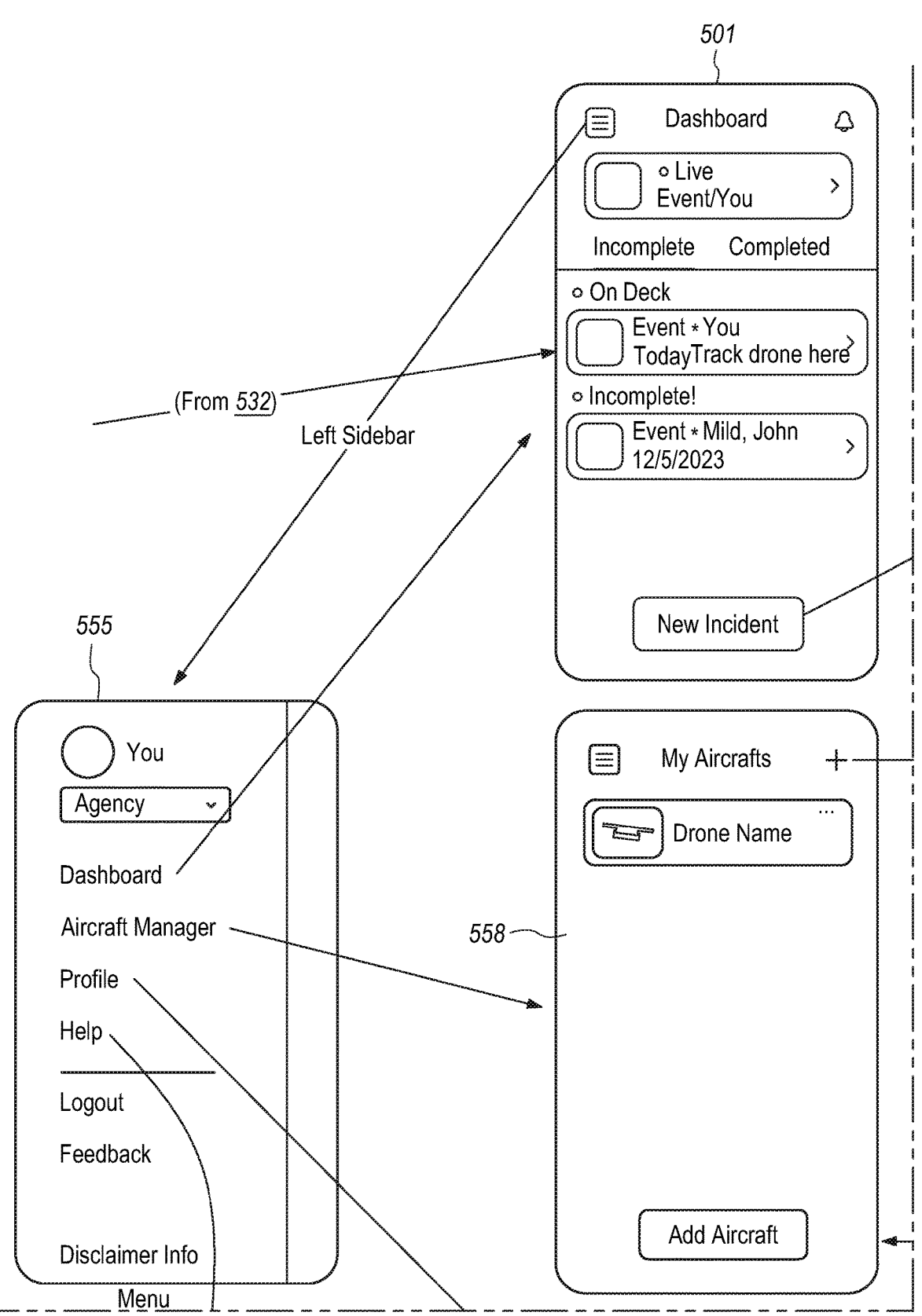
FIG. 5D1

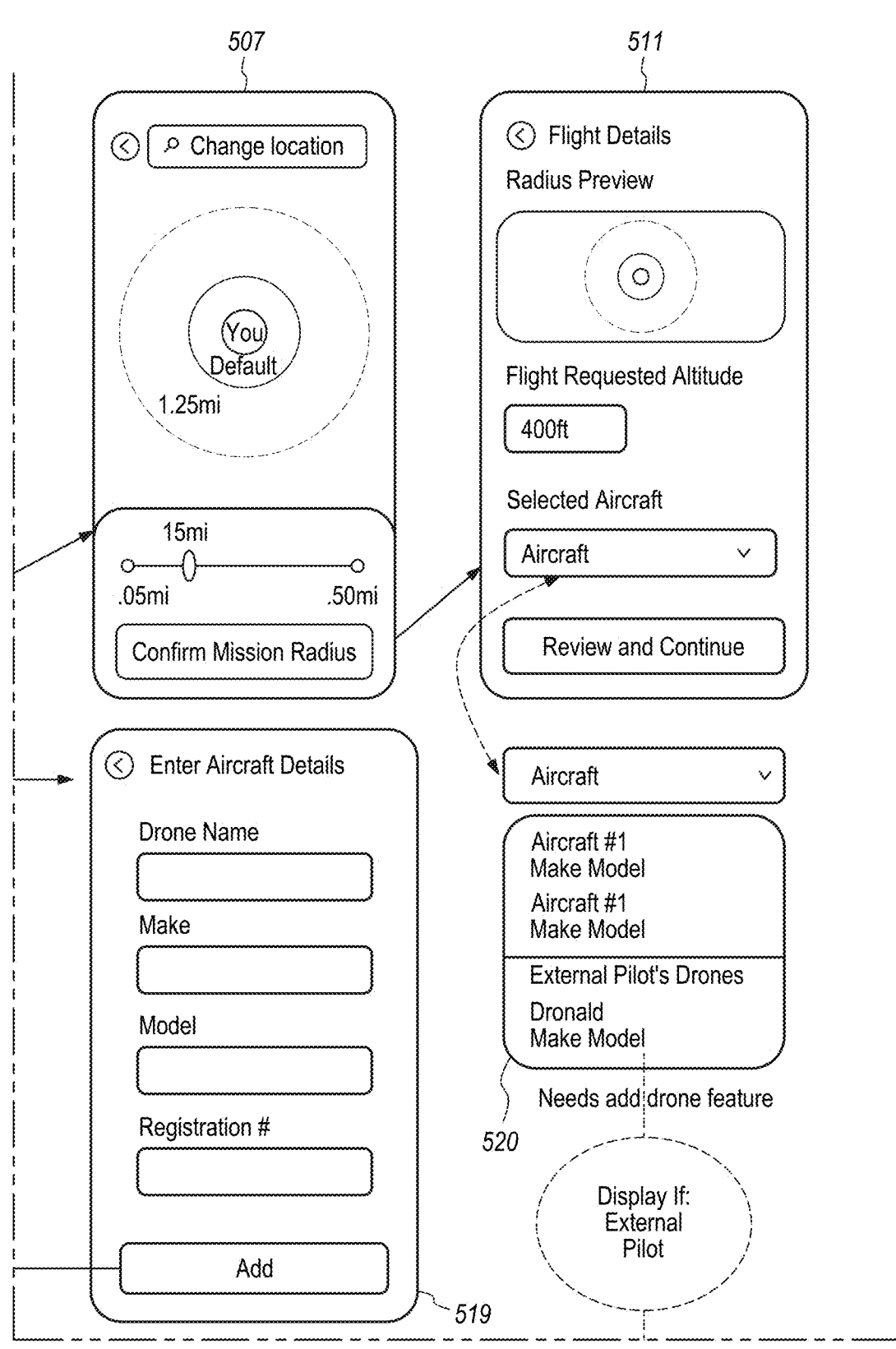
FIG. 5D2

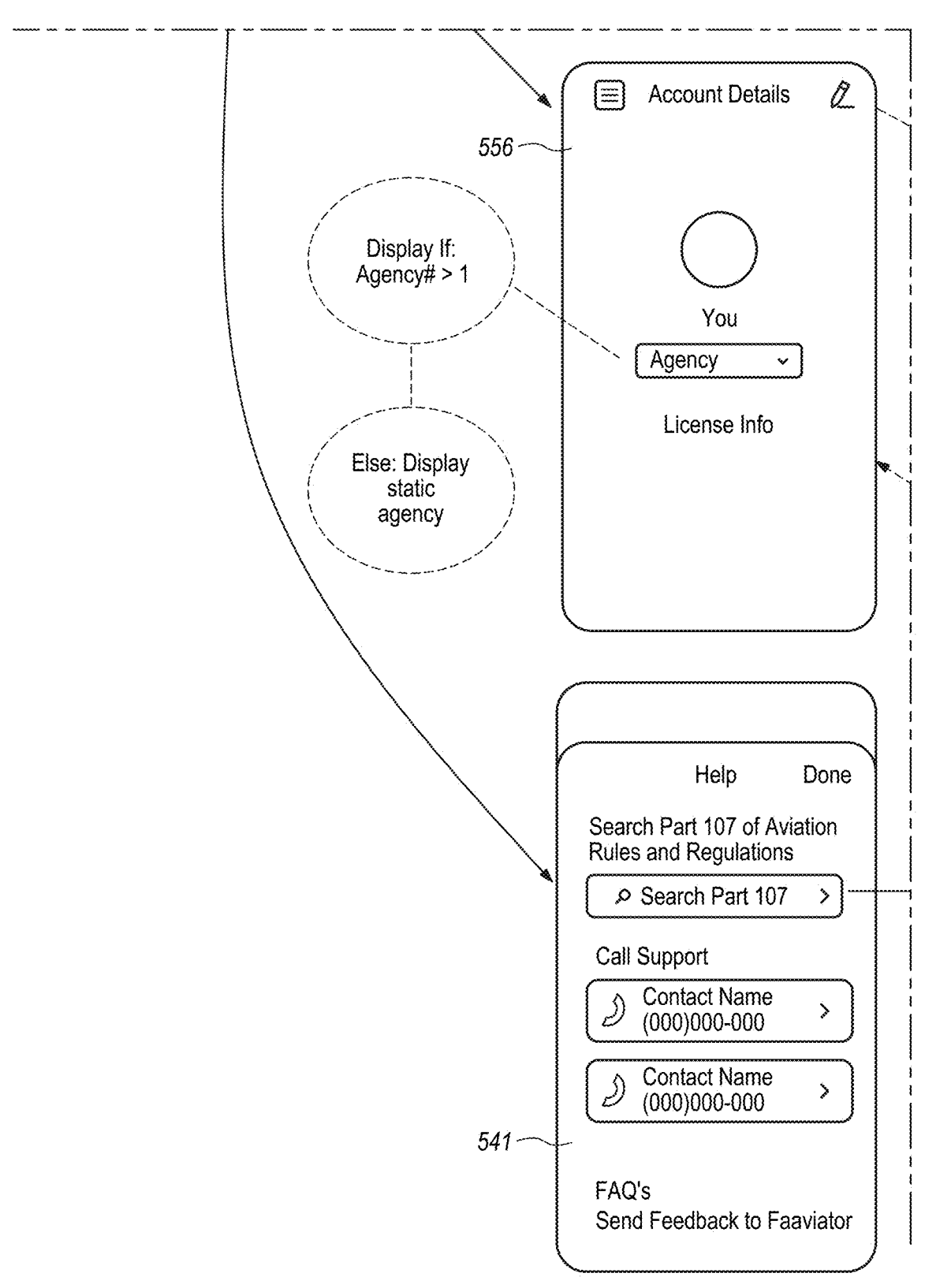
FIG. 5D3

FIG. 5D4

| FIG. 5D1 | FIG. 5D2 |
|----------|----------|
| FIG. 5D3 | FIG. 5D4 |

600

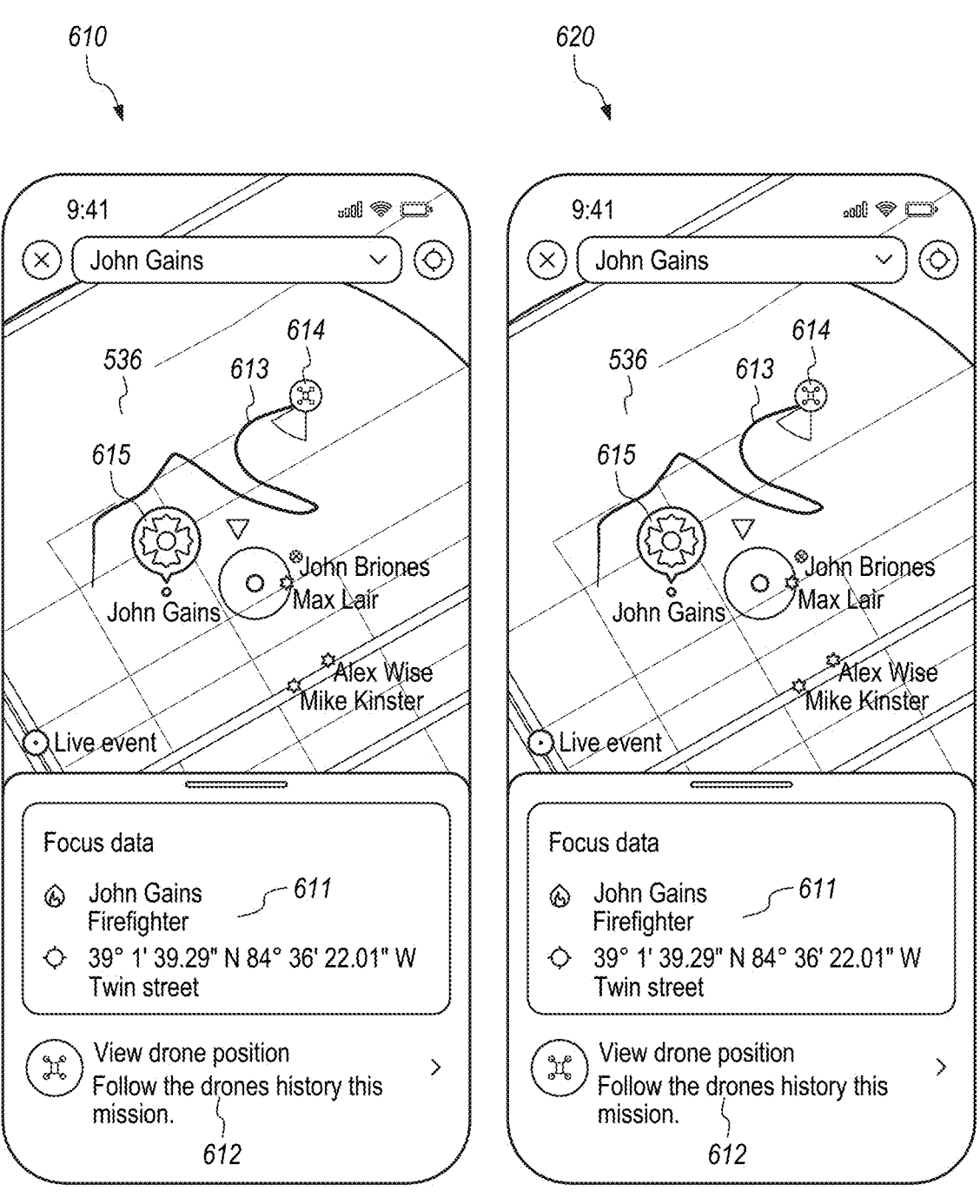
FIG. 6B                    FIG. 6C

AUTOMATED WAIVER REQUEST PROCESSING FOR DRONE OPERATION

CROSS-REFERENCE TO RELATED APPLICATION

This application claims the benefit of U.S. Provisional Patent Application Ser. No. 63/544,612, filed on Oct. 17, 2023 and entitled "Automated Waiver Request Processing for Drone Operation," which is incorporated by reference as though set forth herein in its entirety.

TECHNICAL FIELD

The present document relates to techniques for automatically initiating and/or processing requests for waivers for drone operations, such as in emergency/first responder situations.

BACKGROUND

Emergency services and first responders often use drones (also referred to as unmanned aerial vehicles (UAVs) or unmanned aircraft systems (UASs)) when responding to emergency situations. In many such situations, time is of the essence and lives may be imperiled by any lag time in responding. Thus, it is often essential that any waivers or permits that may be needed to allow operation of drones be processed and issued as quickly and efficiently as possible. Unfortunately, current methods for processing requests for such waivers and permits can be inefficient, involving phone calls, hold times, verbal requests and responses, redundancies, and inaccuracies. Given the highly urgent nature of such requests in the context of life-threatening emergencies, such inefficiencies and delays can be unacceptable and highly costly.

SUMMARY

The techniques described herein automate and simplify the process of requesting and obtaining waivers and/or permits for drone operation, particularly in emergency situations. The described techniques therefore allow for timelier processing of such requests, thereby potentially saving lives and/or property.

In at least one embodiment, a user completes fields for a waiver request. Field values may be saved, refilled, and/or auto-filled as appropriate. In at least one embodiment, a back-end system receives the submitted request and communicates directly with a Federal Aviation Administration (FAA) system operations support center (SOSC) for immediate approval of the request. In this manner, accuracy is improved, redundancy is removed, and application processing is made more efficient and timely.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

FIGS. 6A through 6D depict examples of additional screens for a user interface for implementing the techniques described herein according to one embodiment.

DETAILED DESCRIPTION OF THE EMBODIMENTS

Figure 1:
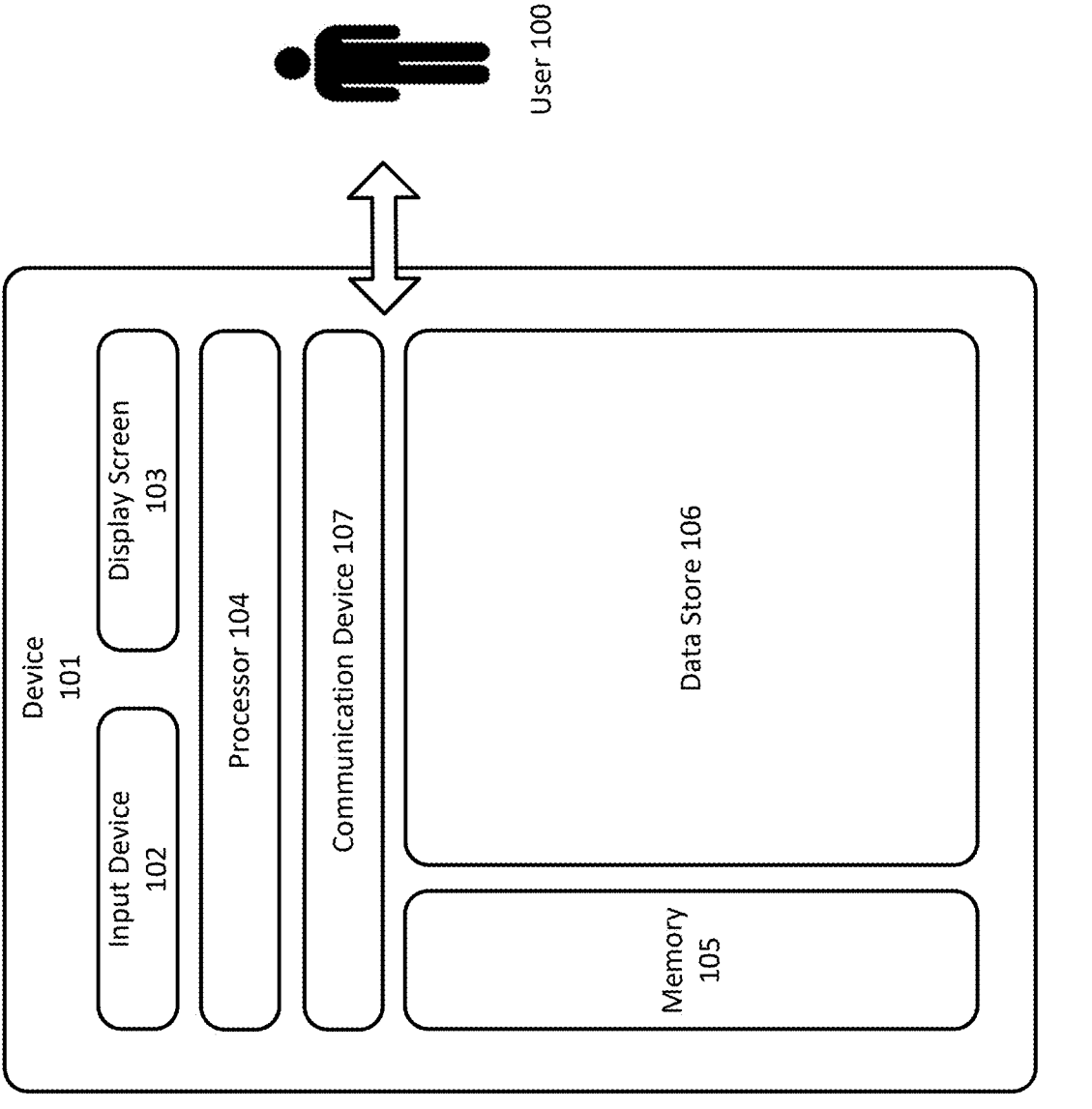
FIG. 1 is a block diagram depicting a hardware architecture for implementing the techniques described herein according to one embodiment.

For illustrative purposes, the system and method are described herein in the context of obtaining waivers and/or permits for operating unmanned aerial vehicles (UAVs, or drones) in emergency situations. One skilled in the art will recognize, however, that similar techniques can be used in other contexts as well. For example, the techniques described herein can be used in any context in which it may be useful or appropriate to obtain waivers and/or permits in an automated manner, particularly whenever time is of the essence.

In some embodiments, one or more hardware and/or software components, as shown and described below in connection with FIGS. 1 and 2, may be used to implement the system and method described herein. In at least one embodiment, such components may be implemented in a cloud computing-based client/server architecture, using, for example, Amazon Web Services (AWS), which is an on-demand cloud computing platform available from Amazon.com, Inc. of Seattle, Washington. Therefore, for illustrative purposes, the system and method are described herein in the context of such an architecture. One skilled in the art will recognize, however, that the systems and methods described herein may be implemented using other architectures, such as for example a standalone computing device rather than a client/server architecture.

Furthermore, the functions and/or method steps set forth herein may be carried out by software running on one or more of device(s) 101, client device(s) 108, server(s) 110, and/or other components. This software may optionally be multi-function software that may be used to retrieve, store, manipulate, and/or otherwise use data stored in data storage devices and/or to carry out one or more other functions.

Definitions and Concepts

For illustrative purposes and for ease of explanation, the following definitions and concepts are used herein:

A "customer", "user", or "end user", such as user 100 referenced herein, may be an individual person, or may be an enterprise, company, family, representative, and/or group that may optionally include one or more individuals. In the embodiments described herein, user 100 may be, for example, a first responder or other emergency personnel.

A "data store", such as data store 106 referenced herein, may be any device capable of digital data storage, including any known hardware for nonvolatile and/or volatile data storage. A collection of data stores may form a "data storage system" that can be accessed by multiple customers.

A "computing device" or "device", such as client device 101 or 108, may be any electronic device capable of digital data processing. In at least one embodiment, the device may communicate with a server such as server 110, provide output to a customer, and accept input from a customer.

A "server", such as server 110, may be a computing device that is configured to run software for back-end processing, and may also provide data storage, either via a local data store, or via connection to a remote data store.

An "entity" may be any individual or group of individuals, wherein such group may include a company, corporation, organization, firm, educational institution, team, religious organization, political party, and/or the like.

A "drone" (also referred to as an unmanned aerial vehicle (UAV) or unmanned aircraft system (UAS) may be any unmanned remotely-piloted or remotely-controlled aircraft.

A "drone operator" or "pilot" may be an individual who will be remotely operating (flying) the drone. In at least one embodiment, the user may be the drone operator, although this is not necessarily the case.

System Architecture

According to various embodiments, the systems and methods described herein may be implemented on any electronic device or set of interconnected electronic devices, each equipped to receive, store, and present information. Each electronic device may be, for example, a server, desktop computer, laptop computer, smartphone, tablet computer, and/or the like. As described herein, some devices may be designated as client devices, which are generally operated by end users. Other devices may be designated as servers, which generally conduct back-end operations and communicate with client devices (and/or with other servers) via a communications network such as the Internet. In at least one embodiment, the techniques described herein may be implemented in a cloud computing environment using techniques that are known to those of skill in the art.

In addition, one skilled in the art will recognize that the techniques described herein may be implemented in other contexts, and indeed in any suitable device, set of devices, or system capable of interfacing with existing enterprise data storage systems. Accordingly, the following description is intended to illustrate various embodiments by way of example, rather than to limit scope.

Referring now to FIG. 1, there is shown a block diagram depicting a hardware architecture for practicing the described system, according to one embodiment. Such an architecture may be used, for example, for implementing the techniques of the system in a computer or other device 101. Device 101 may be any electronic device, including one of those listed above.

In at least one embodiment, device 101 includes a number of hardware components that are well known to those skilled in the art. Input device 102 may be any element that receives input from user 100, including, for example, a keyboard, mouse, stylus, touch-sensitive screen (touchscreen), touchpad, trackball, accelerometer, microphone, or the like. Input can be provided via any suitable mode, including for example, one or more of: pointing, tapping, typing, dragging, and/or speech. In at least one embodiment, input device 102 may be omitted or functionally combined with one or more other components.

Data store 106 may be any magnetic, optical, or electronic storage device for data in digital form; examples include flash memory, magnetic hard drive, CD-ROM, DVD-ROM, or the like. In at least one embodiment, data store 106 may store information that can be utilized and/or displayed according to the techniques described below. Data store 106 may be implemented in a database or using any other suitable arrangement. In another embodiment, data store 106 may be stored elsewhere, and data from data store 106 may be retrieved by device 101 when needed for processing and/or presentation to user 100. Data store 106 may store one or more data sets, which may be used for a variety of purposes and may include a wide variety of files, metadata, and/or other data.

In at least one embodiment, data store 106 may store data for performing various tasks and operations in connection with the functionality described herein. In at least one embodiment, some or all of such data may be stored at another location, remote from device 101, and device 101 may access such data over a network, via any suitable communications protocol.

In at least one embodiment, data store 106 may be organized in a file system, using well-known storage architectures and data structures, such as relational databases. Examples include Oracle, MySQL, and PostgreSQL. Appropriate indexing may be provided to associate data elements in data store 106 with each other. In at least one embodiment, data store 106 may be implemented using cloud-based storage architectures such as NetApp (available from NetApp, Inc. of Sunnyvale, California) and/or Amazon Simple Storage Service (Amazon S3) (available from Amazon.com of Seattle, Washington).

Data store 106 may be local or remote with respect to the other components of device 101. In at least one embodiment, device 101 may be configured to retrieve data from a remote data storage device when needed. Such communication between device 101 and other components can take place wirelessly, by Ethernet connection, via a computing network such as the Internet, via a cellular network, or by any other appropriate communication systems.

In at least one embodiment, data store 106 may be detachable in the form of a CD-ROM, DVD, flash drive, USB hard drive, or the like. Information may be entered from a source outside of device 101 into data store 106 that may be detachable, and later displayed after data store 106 may be connected to device 101. In another embodiment, data store 106 may be fixed within device 101.

In at least one embodiment, data store 106 may be organized into one or more well-ordered data sets, with one or more data entries in each set. Data store 106, however, may have any suitable structure. Accordingly, the particular organization of data store 106 need not resemble the form in which information from data store 106 may be displayed to user 100 on display screen 103. In at least one embodiment, an identifying label may also be stored along with each data entry, to be displayed along with each data entry.

Display screen 103 may be any element that displays information such as text and/or graphical elements. In particular, display screen 103 may present a user interface for entering, viewing, configuring, selecting, editing, downloading, and/or otherwise interacting with data as described herein. In at least one embodiment where only some of the desired output may be presented at a time, a dynamic control, such as a scrolling mechanism, may be available via input device 102 to change which information may be currently displayed, and/or to alter the manner in which the information may be displayed. In at least one embodiment, display screen 103 may be omitted or functionally combined with one or more other components.

Processor 104 may be a conventional microprocessor for performing operations on data under the direction of software, according to well-known techniques. Memory 105 may be random-access memory, having a structure and architecture as are known in the art, for use by processor 104 in the course of running software.

Communication device 107 may communicate with other computing devices via any known wired and/or wireless protocol(s). For example, communication device 107 may be a network interface card ("NIC") capable of Ethernet communications and/or a wireless networking card capable of communicating wirelessly over any of the 802.11 standards. Communication device 107 may be capable of transmitting and/or receiving signals to transfer data and/or initiate various processes within and/or outside device 101.

Figure 2:
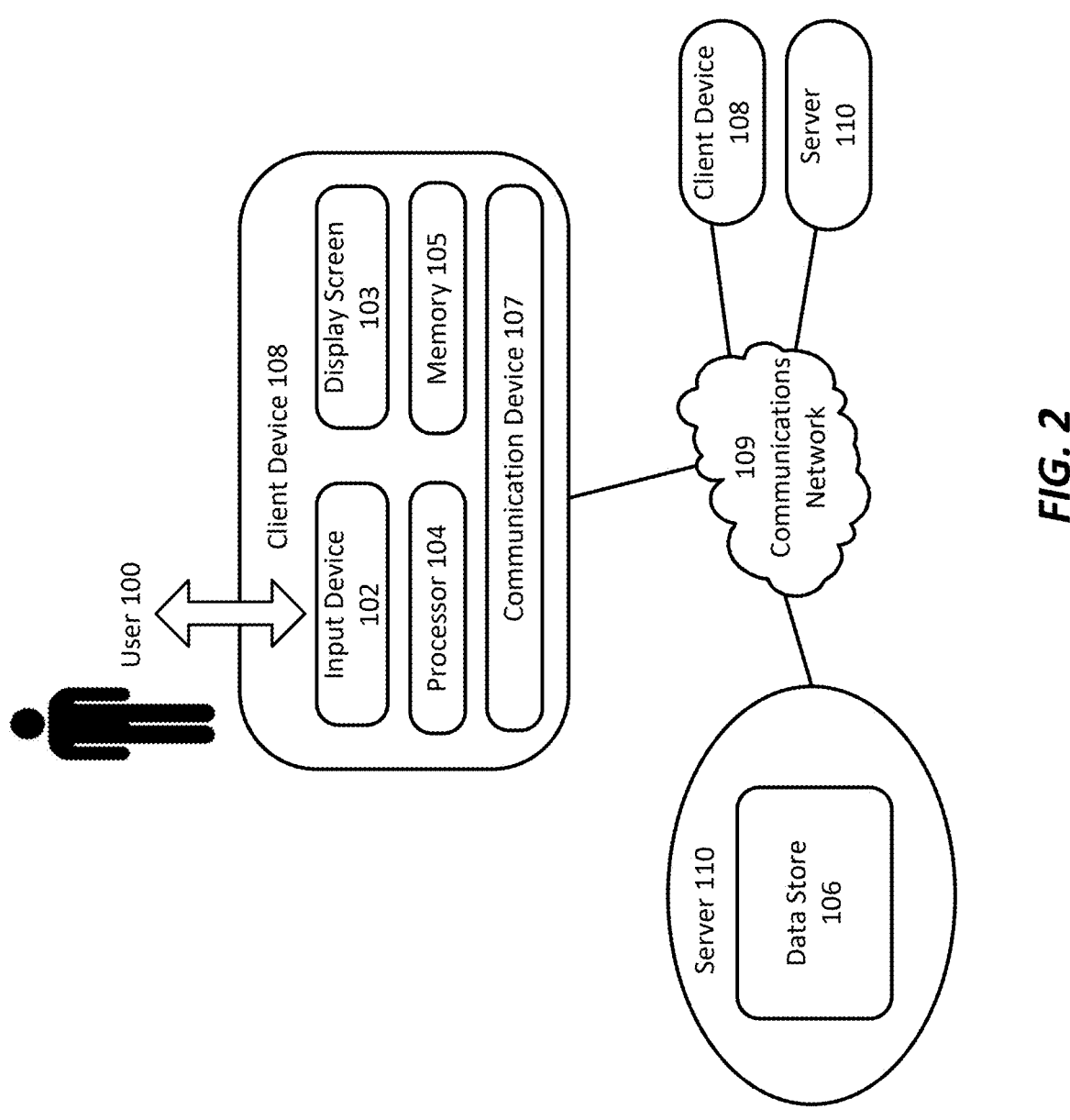
FIG. 2 is a block diagram depicting a hardware architecture for implementing the techniques described herein in a client/server environment, according to one embodiment.

Referring now to FIG. 2, there is shown a block diagram depicting a hardware architecture in a client/server environment, according to one embodiment. Such an implementation may use a "black box" approach, whereby data storage and processing may be done completely independently from user input/output. An example of such a client/server environment is a web-based implementation, wherein client device 108 runs a browser that provides a user interface for interacting with web pages and/or other web-based resources from server 110. Items from data store 106 may be presented as part of such web pages and/or other web-based resources, using known protocols and languages such as Hypertext Markup Language (HTML), Java, JavaScript, Native, React, Swift, Cognito, and the like.

Client device 108 may be any electronic device incorporating input device 102 and/or display screen 103, such as a desktop computer, laptop computer, personal digital assistant (PDA), cellular telephone, smartphone, music player, handheld computer, tablet computer, kiosk, game system, wearable device, or the like. Any suitable type of communications network 109, such as the Internet, may be used as the mechanism for transmitting data between client device 108 and server 110, according to any suitable protocols and techniques. In addition to the Internet, other examples include cellular telephone networks, EDGE, 3G, 4G, 5G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 may transmit requests for data via communications network 109, and may receive responses from server 110 containing the requested data. Such requests may be sent via HTTP as remote procedure calls or the like.

In at least one embodiment, server 110 may be responsible for data storage and processing, and may incorporate data store 106. Server 110 may include additional components as needed for retrieving data from data store 106 in response to requests from client device 108.

As described above in connection with FIG. 1, data store 106 may be organized into one or more well-ordered data sets, with one or more data entries in each set. Data store 106 may, however, have any suitable structure, and may store data according to any organization system known in the information storage arts, such as databases and other suitable data storage structures.

In addition to or in the alternative to the foregoing, data may also be stored in data store 106 that is part of client device 108. In some embodiments, such data may include elements distributed between server 110 and client device 108 and/or other computing devices in order to facilitate secure and/or effective communication between these computing devices.

As discussed above in connection with FIG. 1, display screen 103 may be any element that displays information such as text and/or graphical elements. Various user interface elements, dynamic controls, and/or the like may be used in connection with display screen 103.

As discussed above in connection with FIG. 1, processor 104 can be a conventional microprocessor for use in an electronic device to perform operations on data under the direction of software, according to well-known techniques. Memory 105 can be random-access memory, having a structure and architecture as are known in the art, for use by processor 104 in the course of running software. Communication device 107 may communicate with other computing devices using any known wired and/or wireless protocol(s), as discussed above in connection with FIG. 1.

In at least one embodiment, some or all of the system may be implemented as software written in any suitable computer programming language, whether in a standalone or client/server architecture. Alternatively, some or all of the system may be implemented and/or embedded in hardware.

Notably, multiple client devices 108 and/or multiple servers 110 may be networked together, and each may have a structure similar to those of client device 108 and server 110 that are illustrated in FIG. 2. The data structures and/or computing instructions used in the performance of methods described herein may be distributed among any number of client devices 108 and/or servers 110. As used herein, "system" may refer to any of the components, or any collection of components, from FIGS. 1 and/or 2, and may include additional components not specifically described in connection with FIGS. 1 and 2.

In some embodiments, data within data store 106 may be distributed among multiple physical servers. Thus, data store 106 may represent one or more physical storage locations, which may communicate with each other via the communications network and/or one or more other networks (not shown). In addition, server 110 as depicted in FIG. 2 may represent one or more physical servers, which may communicate with each other via communications network 109 and/or one or more other networks (not shown). Part of data store 106 may reside on device 101 and/or client device 108.

In one embodiment, some or all components of the system may be implemented in software written in any suitable computer programming language, whether in a standalone or client/server architecture. Alternatively, some or all components may be implemented and/or embedded in hardware.

Figure 3:
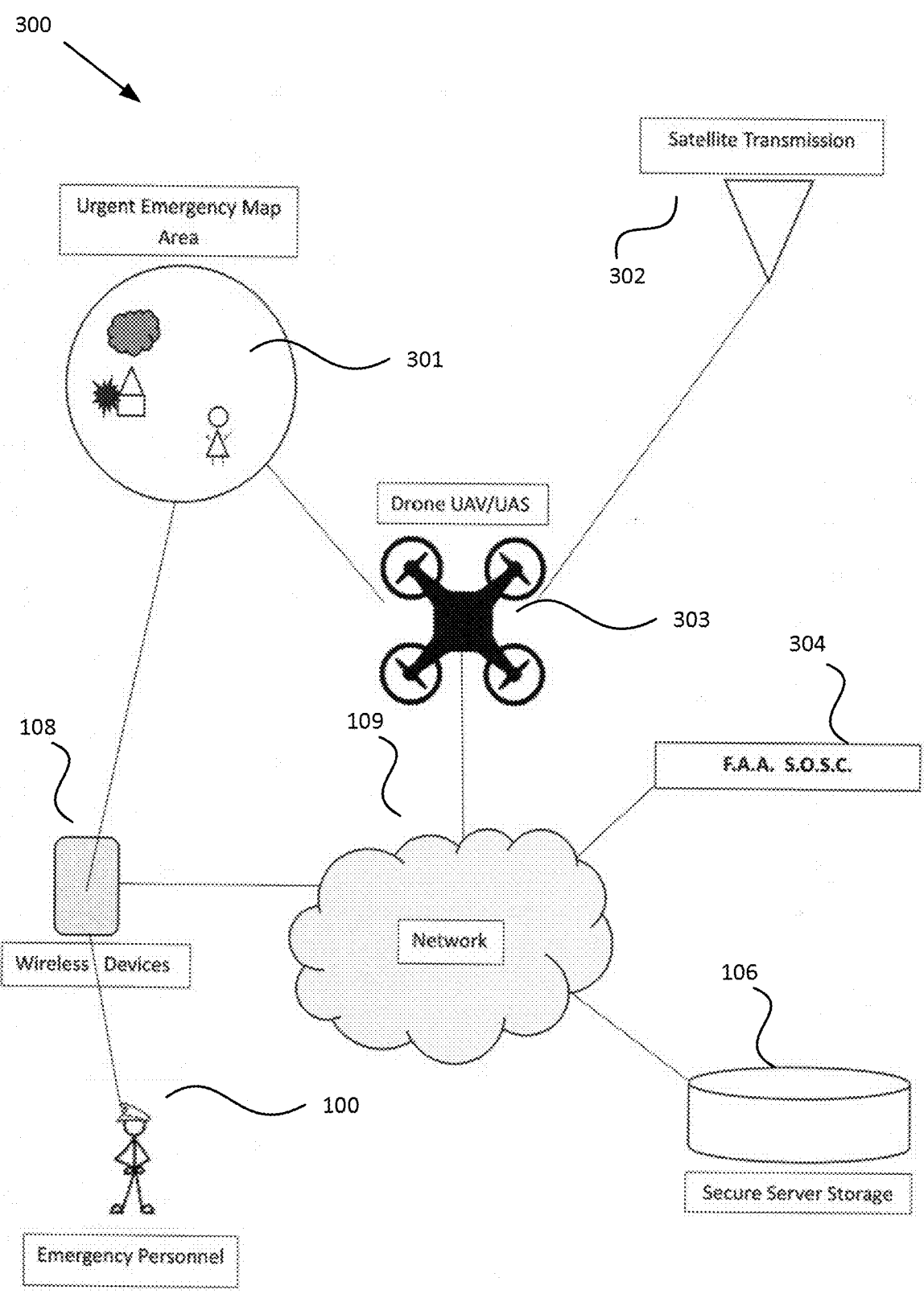
FIG. 3 is a block diagram depicting an example of an overall system architecture for implementing the described techniques according to one embodiment.

Referring now to FIG. 3, there is shown an example of an overall system architecture 300 for implementing the described techniques according to one embodiment. In at least one embodiment, functional architecture 300 may be implemented using hardware components such as those described above in connection with FIGS. 1 and/or 2. One skilled in the art will recognize, however, that other hardware architectures may be used to implement the depicted functional architecture.

One or more wireless device(s) 108 (also referred to herein as "client device(s)") may be operated by user 100

(such as a first responder or other emergency personnel). Wireless device(s) 108 may be, for example, a smartphone, tablet, laptop computer, drone controller, and/or the like. Wireless device(s) 108 may run a software application (an "app") for collecting and transmitting information for obtaining a drone waiver and/or other documentation that may be needed for operation of drone 303 or other device. For example, as described in more detail below, the app may present a form for user 100 to complete in order to request a waiver for operating drone 303.

Each wireless device 108 communicates with an entity such as a Federal Aviation Administration System Operations Support Center (FAA SOSC) 304 that may be responsible for issuing permits and the like for operations of drone(s) 303 and/or similar devices. Communications between device 108 and FAA SOSC 304 may take place via any suitable network 109, such as the internet, using any appropriate protocols for electronic communication. Such communications may include, for example, waiver requests that may be automatically generated using the techniques described herein. If appropriate, secure server storage 106 may be provided, to electronically store details of user's 100 waiver request.

Upon successful processing of a waiver request, FAA SOSC 304 may issue the permit or waiver, and the approval of the waiver or permit may be electronically transmitted to wireless device 108 via network 109, using any appropriate protocols for electronic communication. User 100 may be automatically notified of such approval via wireless device 108 or by any other suitable means. Once such approval has taken place, user 100 can operate drone 303.

In at least one embodiment, once drone 303 is operating, it may make images and/or other important information available to user 100 and/or to other emergency personnel, for example via satellite communication 302 and/or network communication 109. In this manner, user 100 and/or other emergency personnel are able to use the information provided by drone 303 to effectively respond to and deal with the emergency situation. In at least one embodiment, urgent emergency map area 301 may be presented as a pictorial representation and/or video captured by drone 303, viewable by user 100 on wireless device 108. Urgent emergency map area 301 may also depict locations of user 100 and/or other first responders, for example via dots displayed atop a geographical representation such as a map. As described herein, in at least one embodiment, user 100 may control drone 303 operation and video via device 108. In at least one embodiment, satellite transmission 302 facilitates geolocation via GPS of drone 303 and/or device 108.

Method

Figure 4:
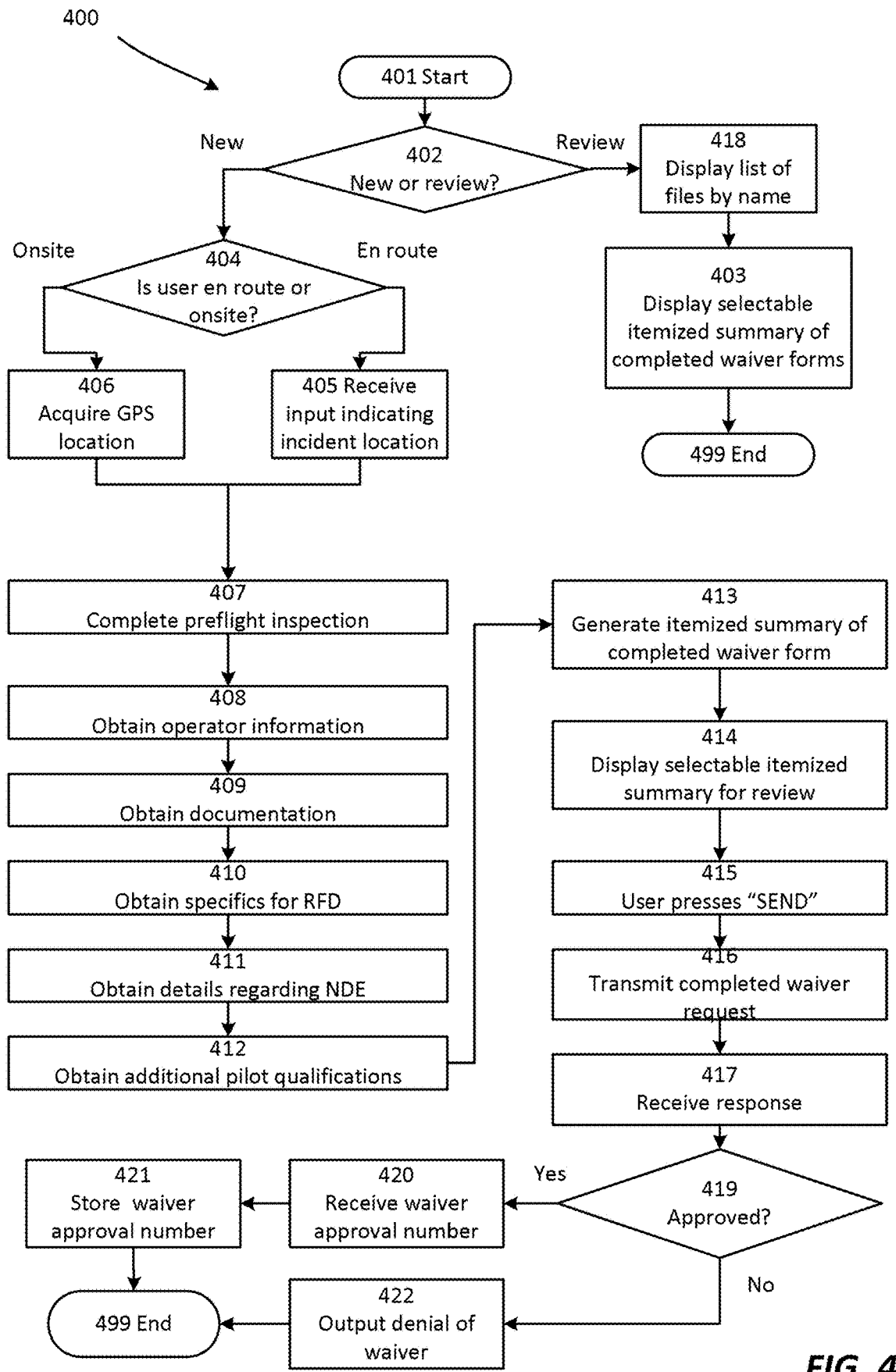
FIG. 4 is a flow diagram depicting an example of an overall method of operation for implementing the described techniques according to one embodiment.

Referring now to FIG. 4, there is shown a flow diagram depicting an example of an overall method of operation for implementing the described techniques according to one embodiment. The steps depicted in FIG. 4 may be performed to automatically initiate and/or process requests for waivers for drone operations in connection with an incident that may be taking place at a location according to one embodiment, as follows.

In at least one embodiment, the described method may be implemented by a software application ("app") running on device 108, which may be a smartphone, tablet, computer, or other client device operated by user 100, who may be a first responder (FR) or other individual.

The method begins 401. Prior to performing the depicted items, user 100 may open a software application ("app"), which authenticates user 100. Any suitable authentication mechanism can be used, such as for example password authentication, biometrics, FaceID, and/or the like. User 100 may be any individual, such as for example a pilot, drone operator, first responder, account manager, other system administrator, or the like. In step 402, user 100 may be prompted to indicate whether they would like to enter information for a new drone flight, or review information previously submitted.

If, in step 402, user 100 indicates that they would like to review previously submitted information, they may be prompted to select a file containing the information to be reviewed. In at least one embodiment, a list of files may be displayed 418, containing information to be reviewed. In addition or instead of the list displayed in step 418, in step 403, a selectable itemized summary of completed waiver forms may be displayed. In at least one embodiment, user 100 can select one or more items to review from the displayed list or summary. As described in more detail below in connection with FIGS. 5A-5G, user 100 can select incomplete waiver applications to modify and complete. In addition, user 100 can select completed applications to review, download, send, store, or link to them.

In at least one embodiment, the system is able to determine a current location of user 100, for example via GPS functionality in device 100. Accordingly, if desired, the location of the incident may be ascertained by automatic acquisition of GPS data; alternatively, it may be ascertained by receiving user input (particularly if user 100 is en route to the incident location and has not yet arrived).

In at least one embodiment, in step 404, user 100 may indicate whether or not they are at the location of the incident. For example, they may be en route to the incident or they may already be onsite. In at least one embodiment, if user 100 is already onsite, the system may automatically ascertain the location of the incident by, in step 406, acquiring GPS location data from user's device 108. Current or nearest city/town and state may also be obtained. Otherwise, in step 405, user 100 may be prompted to enter input indicating the incident location. Such input may be provided using any suitable means, including for example by entering an address in text fields, or by tapping or pointing at a location on an on-screen map. In at least one embodiment, a manual city entry field may be provided, allowing user 100 to override the prefilled information. In at least one embodiment, input may be provided by using artificial intelligence (AI) and/or large language models (LLMs), whereby the system may prompt user 100 to provide the incident location and enter information to be used for the waiver form and for calculating distance, airport ID, class of airspace, and/or coordinates. In at least one embodiment, LLM may be used as the framework for the AI to ask specific questions for the waiver form.

In at least one embodiment, entering the incident address manually may cause the location to be displayed on an on-screen map. User 100 may be able to point to a location on the displayed map to specify a location that takes precedence over the manual entry of address or GPS coordinates. Such functionality may be useful, for example, when the location of the incident may not correspond to an easily entered address.

In at least one embodiment, user 100 may provide additional information concerning the incident or the planned drone flight. For example, user 100 can draw a circle around the incident area on a touchscreen associated with device 108, to indicate expected flight boundaries for the drone flight; the system can then automatically determine distance and direction to/from the nearest airport (for example in nautical miles) flight boundaries or radius for the drone flight, nearest airport and its three-letter code (and direction/distance therefrom), class of airspace (e.g., A to G), and/or the like.

In at least one embodiment, the system may automatically determine distance and direction (D&D) from the nearest airport. For example, the system may calculate the distance (in nautical miles or any other suitable units) from the incident to the nearest airport, as well as the direction from the airport. In addition, using GPS functionality on device 108, the system may automatically calculate nautical miles from the nearest airport to the incident location. For example, user 100 may manually point to a location on a displayed map, or may enter an address, or can obtain current location from GPS functionality on device 108. This information can be used to determine distance and direction from the nearest airport, as well as class of airspace, and can identify such airport, for example via its three-letter identification code.

The app may take current GPS data, or manually entered address info, or location based on the user's input by pointing on an onscreen map, to determine where the incident is taking place. The app may then automatically identify the nearest airport and its three-letter code, determine the distance (for example in nautical miles) and/or direction therefrom, and also determine additional information such as radius, class of airspace, and/or the like. The radius of flight may be determined based on user input, which may be provided via an interactive map in which user 100 may point and draw a circle of flight on a map displayed on device 108. As one example, referring now to FIG. 5A, user 100 may use slider 510 to adjust the radius circle shown on the map. Alternatively, user 100 may manually enter the radius of flight.

In at least one embodiment, the app may obtain current date and time information from device 108 on which it is running, and can populate a date from/to entry field accordingly. Options may be provided for manually entering and selecting date and time, for example from a calendar box and/or menu. If appropriate, time may be converted to a consistent format (such as 24-hour military time).

The system may then prompt user 100 to enter various basic qualifications for the drone waiver application. As described in more detail below, this can include displaying checkboxes corresponding to commonly selected options, and/or text fields for entering more detailed information.

In at least one embodiment, in step 407, user 100 may be prompted to indicate whether a preflight inspection has been completed. Before each flight, the pilot may inspect drone 303 to ensure that it is in a condition for safe operation; the inspection may include, for example, checking for equipment damage and/or malfunction(s). In at least one embodiment, the preflight inspection is conducted in accordance with the drone manufacturer's inspection procedures and/or an inspection procedure developed by the drone owner or operator. In at least one embodiment, a checkbox may be presented to allow user 100 to indicate whether the preflight inspection was completed. As described below in connection with FIG. 5F, a summary review screen 573 may be provided, including a selectable option to indicate whether the preflight inspection has been completed; if not, user 100 may tap on a link to be taken to a checklist of items for such an inspection.

In at least one embodiment, in step 408, user 100 may be prompted to enter operator information, such as license information for the drone operator (i.e., pilot). Such information may include, for example, identifying information for the pilot's Remote Pilot Certificate (under FAA Small UAS Rule Part 107). Such information may come from a roster, and may further include any or all of the following:

Op. Org.

Address.

P.O.C: Name, contact information

P&O's: Names, contact information

Drone type and registration number

Originating Agency Identifier (ORI)

The information may be provided by user 100 via input device 102 on device 108, using any suitable user interface as may be displayed on display screen 103. Some or all information may be auto-filled, if appropriate, based on previously entered information for other incidents. Menus and/or manually entered text fields may also be provided.

Basic qualifications may be made viewable with selectable check boxes. For example, user 100 can select organization information that has been previously entered by an account manager or by user 100; such information may be automatically entered in the waiver request form. In at least one embodiment, selectable check boxes may be provided to specify basic qualifications. In at least one embodiment, these items may be displayed for review prior to submission, as described below in connection with FIG. 5F. For example, user 100 can select such information as the following:

Indicate whether they possess a COA or Part 107 license

Confirm the drone operation is supporting an emergency operation.

Confirm that the requested approval cannot be secured via normal processes to meet the urgent need A roster may be built by user 100 or by an account manager, including the pilot's name and other relevant information (such as contact information). Information from the roster may be used to autofill entries on forms within the app. In at least one embodiment, the received information may be used to initiate an Internet search on the FAA license database (or other source) to retrieve additional data about the pilot (drone operator), including for example an address, a licensing date, and/or the like. Such information may be retrieved by or pushed onto the app. User 100 may enter or select dates for the waiver request; alternatively such information may be auto-filled to the current time and date when the app is opened. In at least one embodiment, such information may be displayed for review prior to submission, as described below in connection with FIG. 5F. Such information can then be transmitted to the FAA or other agency. In at least one embodiment, the form cannot be submitted without specifying the pilot's license information. Roster data may include, for example, any or all of the following:

Operator Organization (such as an agency or company)

Operator Address

Point of Contact (such as for example, name, office, mobile phone number, and/or email address)

Type of all UASs and Registration Numbers

Pre-existing COA number

Entire COA document

Each Pilot License

Each observers name, mobile number, and/or email address

In at least one embodiment, the system may present fields for manually entering information for up to three official drone observers, including for example names, phone numbers, and email addresses. If an observer is within range of Wi-Fi and/or Bluetooth, the system can cause the observer's phone to cause information to be transmitted from the observers, such as names, phone numbers, and/or email addresses. In at least one embodiment, such information may be displayed for review prior to submission, as described below in connection with FIG. 5F, and user 100 may be given the opportunity to confirm, add, remove, and/or modify such information.

In at least one embodiment, information about previous observers and/or other first responders may be stored and made available for future use selection. Names, phone numbers, email addresses, and the like may be made available through drop-down selection or by other means. Users 100 and/or other first responders that are accessing the app may have their information stored for records and for future use via selectable drop-down menus and/or to facilitate future contact.

In at least one embodiment, information about drone type and registration numbers may be pushed to the app, and the app may provide menus to allow user 100 to select and/or manually input specific characteristics for drone 303. In many situations, using previously entered information from the account manager to auto-fill the form may be the quickest way to provide relevant information; alternatively, the system may provide an option to collect the information from drone 303. If there are departments/agencies that use multiple drones, the system may automatically create and present selectable drop-down boxes or menus. In at least one embodiment, once drone 303 has been activated, drone's 303 type and registration number may be automatically made available and/or transmitted to the app. In some situations, device 100 itself (e.g., user's 100 cell phone) may be used to control and/or fly drone 303, for example via Wi-Fi or other wireless communication means.

Once the needed information has been entered, in step 409, the system may obtain appropriate documentation to support the waiver request. Step 409 may be performed automatically, for example, by performing an online search of appropriate records to obtain the pilot's information, or by prompting user 100 to enter the required information. The obtained information may then be automatically saved for use in an expiration reminder program. In addition, the obtained information can be used to preload an Operators Information section of the waiver application form. In at least one embodiment, information regarding the pilot's license and/or Certificate of Waiver or Authorization (COA), may be auto-filled from the FAA website and/or from other sources, or may be entered manually in response to a prompt.

In at least one embodiment, user 100 may input information corresponding to a preexisting COA number at a website associated with the described system. The document (or information extracted therefrom) may then be automatically pushed to the app after retrieving the completed form from the FAA website. Alternatively, user 100 or manager can download the entire COA to the website to be used in the Documentation Section of the waiver form during the drone waiver processing operation.

In at least one embodiment, the system uses artificial intelligence (AI) to help identify, define, and send a description of the incident or emergency to an appropriate agency (such as the FAA) as part of the process of submitting a waiver request.

In step 410, specifics for the Requested Flight Details (RFD) may be obtained. Such information may be obtained, for example, by prompting user 100 and receiving input from user 100. Such information may include, for example:

Date of requested flight (which may be provided via a touch-selectable calendar on device 100);

Time of requested flight;

Location (e.g., city, state, and/or full address);

Distance and direction (D&D) from nearest airport (e.g., 6 nautical miles W of SFO);

Class of airspace (e.g., "A/B/C/D/E/G");

Altitude (e.g., "<400");

Details for Geospatial Information Systems (GIS) (e.g., "XX:xx:xxN/xxx:xx;xxW-. 25NM radius").

Details GIS may include any relevant information associated with the planned flight path and/or the emergency situation, such as for example GPS coordinates. In various embodiments, such information can be obtained from GPS components of device 108. Such information may be specified, for example, as latitude/longitude values or any other suitable format. Such information may be provided manually or automatically.

In step 411, details regarding the Nature and Description of Event (NDE) may be obtained. These may include expected details for the drone flight. Such information may be provided, for example, by user input into app running device 108, input with AI conversation (LLM) voice translator/transcriber, and/or the like. In at least one embodiment, NDE details may be provided in response to prompts presented, for example, as menus, checkboxes, text input fields, and/or any combination thereof. Examples of NDE details include:

Firefighter (FF), Law Enforcement (LE), Search & Rescue (S&R)

Local/National/Natural Disaster (L/N/ND)

In at least one embodiment, first responders may use a 10-code (police code) to provide information about the incident or emergency. Options may be provided to select appropriate codes via menus or by other user interface mechanisms. Accordingly, in at least one embodiment, collection of NDE details may include translating 10-codes received from first responders into plain language descriptions and/or using a menu of frequently used descriptors, to allow the FAA, SOSC, or other entity to better understand the nature of the emergency. Examples of 10-codes include:

10-31: Crime in progress/in pursuit 10-32: Person with a gun 10-80: Pursuit in progress 10-90: Bank alarm 10-2000: Police required immediately In at least one embodiment, user 100 can tap on a button and speak a 10-code for the incident. The system may then translate the spoken code using speech recognition, and send a report of the incident to the FAA and/or other relevant authority. In at least one embodiment, user 100 can tap on a map to cause a completed waiver form to be simultaneously transmitted to the FAA using the tapped location and 10-code translation. As described herein, the completed form may be sent via messaging, email, or via an internet or intranet connection. Alternatively, a phone call can be automatically generated using the provided information. In another embodiment, user 100 can tap a button, or an AI agent may initiate a conversation to prompt a First Responder to provide a location and description; the received information may then be used to populate a review screen including other prefilled information. The waiver request may then be sent as described above.

Alternatively or additionally, common incident statements can be provided as options from which user 100 can select, allowing emergency 10-codes to be easily translated into a plain language description of the emergency for the FAA or other body. In at least one embodiment, linkable access to a searchable part 107 entire section can be provided, to allow user 100 to quickly reference questionable items (such as definitions of class of airspaces A-H).

In at least one embodiment, in step 412, the system may prompt user 100 to enter any additional pilot qualifications. Examples of such information may include:

Sport/Recreational/Private pilot certificate number commercial/airline pilot certificate number flight instructor certificate number In at least one embodiment, if a pilot license has been previously entered or stored (for example, if it is entered via a website associated with the described system), such document (or information extracted therefrom) may be automatically pushed to the app running on device 108, for use during the drone waiver processing operation.

In steps 413 and 414, an itemized summary of the completed waiver form may be generated and displayed. User 100 is then given an opportunity to review the summary. The display may be itemized, allowing user 100 to select individual items for modification if desired. User 100 may then be prompted to press a "send" button to initiate transmission of the waiver request.

In at least one embodiment, speech synthesis may be used to enable the system to read the summary of the waiver form, in particular any mandatory entries, before submission. Such an approach may be particularly helpful in emergency situations where it may be difficult for user 100 to interact with a screen for final approval of the waiver request.

In at least one embodiment, an incident map can be displayed indicating locations of various personnel such as first responders; these locations may be signified by indicators (such as icons, dots, symbols, or badges) which may be selectable by user 100. In at least one embodiment, the app interfaces with available mobile location services such as GPS functionality on device 108, together with user identification information, to present data about personnel via the active incident map. In at least one embodiment, the system may also initiate a phone call to the FAA SOSC and may use speech synthesis to verbally give the 10-code, translation, location, and/or other information to the FAA SOSC.

In at least one embodiment, the app may allow user 100 to share per-incident app access via a QR code that may be sent to subscribers and/or non-subscribers. The QR code may thus be used for sharing access with anyone, subject to permissions to access GPS data and other relevant information such as name, phone #, email, title, department, and/or the like. On-site subscribers may be able to select and see a live incident map via the app. The live incident map may show locations of various personnel such as first responders, and may provide an interface to allow user 100 to share access to the incident map. The live incident map may also provide an interface to allow user 100 to share access to information services that provide information such as name, title, department, and/or other identifiable useful information such as Originating Agency Identifier (ORI) for each person depicted on the map. In at least one embodiment, user 100 can tap or hover over an on-screen indicator for a person to see the additional information for that person.

In step 416, once user 100 has activated the "send" button or otherwise confirmed that the request should be sent, the waiver request may be automatically transmitted to the appropriate authorities. In at least one embodiment, the waiver request may be a "FAA Request Form for Expedited SGI Waiver or Authorization for UAS Operation." Output may be presented on device 100 to indicate that the request has been transmitted and is awaiting approval.

In at least one embodiment, the system may automatically validate the information before transmitting the request, to ensure that at least the minimum required information, such as mandatory entries in each of the prompted fields, is provided.

In at least one embodiment, automatic transmission of the waiver request in step 416 may take place by automatically generating and sending an email message (or other type of message, such as a text message, iMessages message, or the like) to the SOSC. Other mechanisms may be used for transmission of the request. In at least one embodiment, the completed request form may be transmitted over the internet, an intranet, or any other computing network, via any suitable protocol, for visibility at the SOSC to allow the appropriate personnel to approve the request substantially instantaneously. In at least one embodiment, once the waiver request is completed and transmitted to the appropriate authorities, it may be made permanently available for download or reference at the First Responder (FR) agency.

In at least one embodiment, an FAA intranet access point can be provided to allow completed forms to be instantaneously approved by the SOSC with interactive indications on the app. By enabling direct contact with an FAA intranet, the system can expedite and simplify the process of submitting requests and obtaining approval.

In step 417, the system may receive the response from the FAA or other authority. If, in step 419, the waiver request is approved, the system may, in step 420, electronically receive the waiver approval number from the FAA, and, in step 421, store the number as part of the file ID record associated with user 100. Output may be presented to user 100 to indicate approval (for example, "Approved, flight #clear for takeoff", with an indication of the file name for the approval data).

In at least one embodiment, the SOSC can instantly communicate with the requester by clicking on a button to call or send a message to the requester, and vice versa.

If, in step 419, the waiver request is denied, the system may, in step 422, output an indication of the denial (and, optionally, the reason for the denial) for user 100.

The method then ends 499.

In at least one embodiment, a video feed may be provided that may be sharable among a number of devices 108, such as devices operated by user 100 and/or any number of first responders and/or other individuals. The video feed may include an interactive map showing indicators of locations of each first responder. The video feed may also include video from each drone, which may be presented in a selectable and/or simultaneous view. Indicators of different colors may be used to denote different people or points of interest in the scene, such as for example: yellow for perpetrator/main focus; blue for police; red for fire personnel; green for pilot; and/or the like. In at least one embodiment, user 100 can tap on or touch any displayed indicator to cause the system to display more information, such as for example a name, identification, and/or the like. In at least one embodiment, a trail tail can be depicted in the live and/or incident map to detect the drone flight.

In at least one embodiment, the system may be implemented in a secure manner, using a hack-proof and/or closed network.

In at least one embodiment, certain prerequisites may be required before the above-described steps can be performed. For example:

A requirement may exist that the individual who will control drone 303 must be a First Responder (FR).

In order to apply for the drone waiver, a Part 107 Pilot License, Certificate of Waiver or Authorization (COA), or other appropriate certification/documentation may be required.

A smartphone or other similar device may be required, so as to provide capability for GPS location services, messaging functionality, internet connectivity, and/or email capability. If needed, appropriate authentication mechanisms (whether by password, biometrics, or the like) may be in place to ensure that the person initiating the request is who they say they are.

A requirement may exist that drone 303 to be used must be appropriately registered and/or licensed for use in the relevant jurisdiction(s).

Data Validation

As mentioned above, in at least one embodiment, the system ensures that, before the waiver request is transmitted, at least the minimum required information, such as mandatory entries in each of the prompted fields, is provided. Accordingly, in at least one embodiment, if any information is missing or incorrectly entered, the relevant fields can be highlighted and user 100 may be prompted to enter (or re-enter) the needed information. For example, an onscreen alert may be presented in a distinctive color (such as red), and/or the fields for the missing or incorrect information can be outlined in a distinctive color (such as red). In addition, the Submit button may be grayed out and/or inactivated so that user 100 cannot proceed with submission until the required information is properly entered.

In this manner, in at least one embodiment, if any required information is missing, incomplete, or incorrectly entered, the system can stop the form from being submitted to the relevant authorities.

For example, if user 100 checks a box in the Nature and Description of Event (NDE) (mandatory) area of the form, then they may be required to enter a text description of the NDE; otherwise, the entry field is highlighted in red and user 100 may be prevented from proceeding with form submission.

If secure FAA intranet access connectivity is available, the completed form may be transmitted for processing at FAA screen/computer for immediate interactive action. If such connectivity is not available, then the completed form may be automatically emailed, and a phone call can be made to follow up and receive approval.

In at least one embodiment, data validation can also be performed to ensure that correct and valid information has been entered. For example, if the user enters information for their license, the system may perform a search of FAA records to determine the validity of the license. If no record is found, or if it is determined that the license has expired or is not valid, the user may be prevented from proceeding with the waiver request (for example, the "Send" button may be disabled). Explanatory text may be provided to let the user know why they cannot proceed.

User Experience

In at least one embodiment, the app running on device 108 offers a user experience for allowing easy entry of information for initiating and transmitting the waiver request, as follows. In at least one embodiment, the information may be provided via voice interpretation and/or transcription, for example using artificial intelligence (AI) and/or large language models (LLMs).

Data Entry: Nature and Description of Event (NDE)

In at least one embodiment, the system facilitates easy entry of the Nature and Description of Event (NDE), for example by providing some number of checkboxes for entry of urgent Unmanned Aircraft System (UAS) Ops information. These may include, for example, fire fighting, law-enforcement, search and rescue, local/national/natural disaster, and/or the like. An "other" box may be provided, with a text entry field, for entry of information that does not fit in the predefined categories.

In at least one embodiment, the system may provide pre-loaded, editable, descriptions for quick entry of relevant information. Examples include active shooter, active fire, drug intervention, lost person, car accident, investigation, prison escape, pursuit, surveillance, search and rescue, and/or the like. In at least one embodiment, a text field may be provided for entering the description of the event or emergency. A "10-code" menu (or other interface) may be provided to translate, encode, explain, and/or describe the emergency or emergency.

In at least one embodiment, the provided checkboxes may be prefilled based on how they were completed for previous events/incidents, but may be changeable.

In at least one embodiment, current date and time may be automatically filled in when user 100 opens the app. Alternatively, the system may prompt the user to indicate "What military time and date will the incident start?" or "Start now?"

Data Entry: Additional Pilot Qualifications (APQs)

In at least one embodiment, the system facilitates easy entry of additional pilot qualifications (APQs), for example by providing a number of checkboxes for entry of such information. These may include, for example, sport/recreational/pilot certificate(s), commercial/airline pilot certificate(s), flight instructor certificate(s), and/or the like.

In at least one embodiment, the provided checkboxes may be prefilled based on how they were completed for previous events/incidents, but may be changeable.

Data Entry: Final Review

In at least one embodiment, all information provided by user 100 via the above-described interface elements may be gathered and displayed via a completed form for review by user 100. In at least one embodiment, user 100 can expand displayed fields in the completed form, for example by double-clicking on them. In at least one embodiment, user 100 can edit or correct any entries in any displayed fields. In at least one embodiment, the system can highlight or display (for example, in red or some other distinctive color) any fields or information that may be incomplete or missing, particularly if such information is required before the waiver request can be submitted.

In at least one embodiment, a summary button may be provided, to allow user 100 to confirm that the completed form has been reviewed and is ready to be submitted. A statement can be provided, such as "Please review total form for accuracy before sending to SOSC".

"Send" Button

In at least one embodiment, a "Send" button may be provided, which automatically transmits the waiver application to the appropriate authorities for review.

Any suitable means may be used for transmission of the application. For example, in at least one embodiment, the "Send" button may cause a formatted email to be automatically sent to the FAA SOSC for review. In at least one embodiment, the system determines if the SOSC is staffed at the time the form has been completed, and automatically sends the email (or other message) if the SOSC is staffed at that time (such as, for example, between the hours of 0600-2400 EST). The system may automatically notify user 100 (and/or the FR, if a different person) when the email (or other message) has been sent, delivered, and/or read.

In at least one embodiment, if the SOSC is closed at the time the form is filled, a notification may be automatically sent to alert user 100 that the SOSC is closed. The system may then schedule the email for sending at a later time. Alternatively, the system can automatically initiate a phone call to the appropriate direct number for the SOSC and use automated speech synthesis to present the needed information audibly to the SOSC, for example using AI and/or LLM. This may occur optionally during or after business hours; a voicemail message may be left, for example if the first responder is en route and unavailable to receive the call.

In at least one embodiment, the system can automatically send the information in the completed form via an intranet associated with the FAA, or by any other suitable means. In at least one embodiment, the system may display an indication of transmission, receipt, and/or status of the request, for example by displaying any message such as:

"FAA approved; cleared for takeoff";

"FAA disapproved; please call for more information"; and/or

"More clarifying information needed."

Additional Links/Buttons

In at least one embodiment, the system may display phone numbers, contact information, tech support information, and/or a help button for enabling and/or facilitating contact with the SOSC and/or other entities. Thus, for example, user 100 may tap an onscreen button to instantly send a message or initiate a phone call with the SOSC and/or other relevant entity. In at least one embodiment, a button may be provided to automatically add relevant contacts for requesting/obtaining waivers to user's 100 phone contacts and/or directory.

In at least one embodiment, the system may display a link that provides access to 14 CFR (Code of Federal Regulations) Part 107 (Small Unmanned Aircraft Systems), and may automatically generate a notification or alert to inform user 100 if any information on the form changes. Alternatively, the system may provide access to a searchable form within the app to obtain such information.

In at least one embodiment, in order to get started using the app, user 100 may first create an account and provide information, such as for example license information, pilot address, email, phone number, COA, and/or the like. In addition, a payment method may be required and/or provided.

Saved File

In at least one embodiment, the form representing the waiver request (whether approved or declined) may be saved and/given a file name (example department/RPD or FAA APPROVED #, date Aug. 20, 2023). The file may be saved locally on device 108, or in cloud-based storage 106.

In at least one embodiment, the saved file may be made available to transmit by email, message, or by other means. The file may also be downloadable, and/or may be made available to copy, paste, or save to another location, and/or to attach to a case file.

In at least one embodiment, if a form is incomplete or still in progress, periodic alerts can be provided to user 100, to remind them to complete the form. Such alerts may be sent via any suitable notification method, and/or can be sent via text and/or email. Such alerts may indicate "open or incomplete form", and may indicate area(s) that need attention, for example, by a visual indicator and/or other means.

Mandatory Information

In at least one embodiment, some fields in the waiver request form may be designated as mandatory information required by the FAA in order to approve the waiver request. In at least one embodiment, the system may highlight such mandatory information fields using any suitable visual indicator(s). A reminder of any necessary information may be provided, particularly for those fields that have not yet been completed.

For example, a field may require that the form specify an emergency/urgent operational need that will benefit the public good by allowing operation of drone 303.

In at least one embodiment, a field may require that the request specify a FR with a COA on file or a 107 Pilot License. In at least one embodiment, fields may require information about user's 100 contact information (such as a phone number and/or email address), as well as details about drone 303.

Additional Functionality

In at least one embodiment, a visual, live drone video feed may be shared among all users of the app, including FRs who may already be on-site. This video feed may show locations of each FR on a map, tethered together so that all app users and/or FRs may be displayed in a single live video feed. If two or more drones are already on-site, a split screen or selectable view may be provided. On the map, colored badges or other indicators may be used to indicate different types of FRs. For example, yellow may indicate a perpetrator or main focus; blue may indicate police; red may indicate fire department; green may indicate drone operator (pilot); and the like. A user may tap any colored indicator to see further details such as name and/or identification number. Appropriate security and authentication protocols may be implemented to ensure that the system is hack-proof.

In at least one embodiment, a PIC (Pilot in Command) or other user 100 may be provided with functionality for a selectable "drone video feed share" that generates a QR code that may be shared with other users, such as users in other agencies. The QR code may then be used on-site or via text messaging, to allow access to the drone video feed as appropriate. In at least one embodiment, the live video feed and/or incident map may display drone flight history tracking in visual form.

Example of User Interface

Figure 5A:
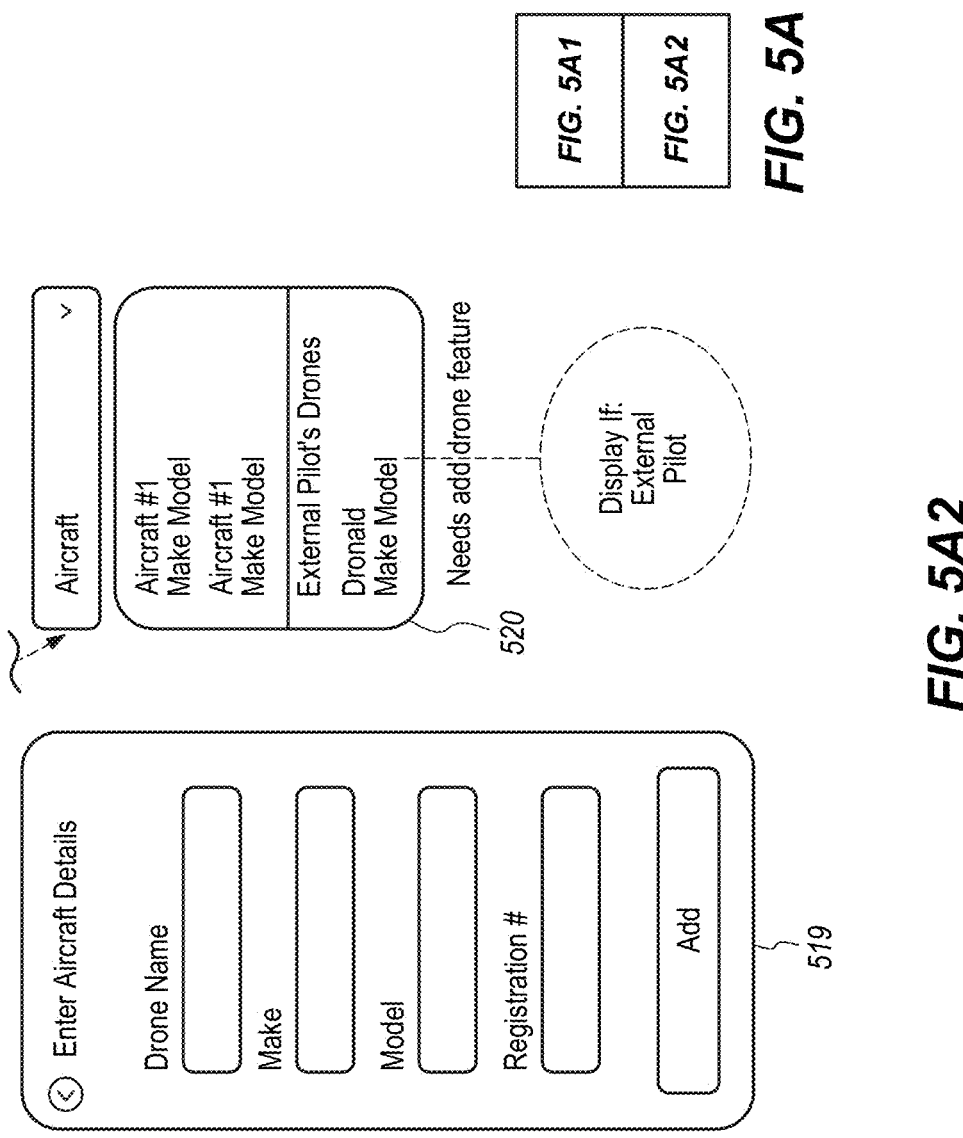
FIGS. 5A and 5B depict examples of screens for a user interface for implementing the techniques described herein according to one embodiment.
Figure 5B:
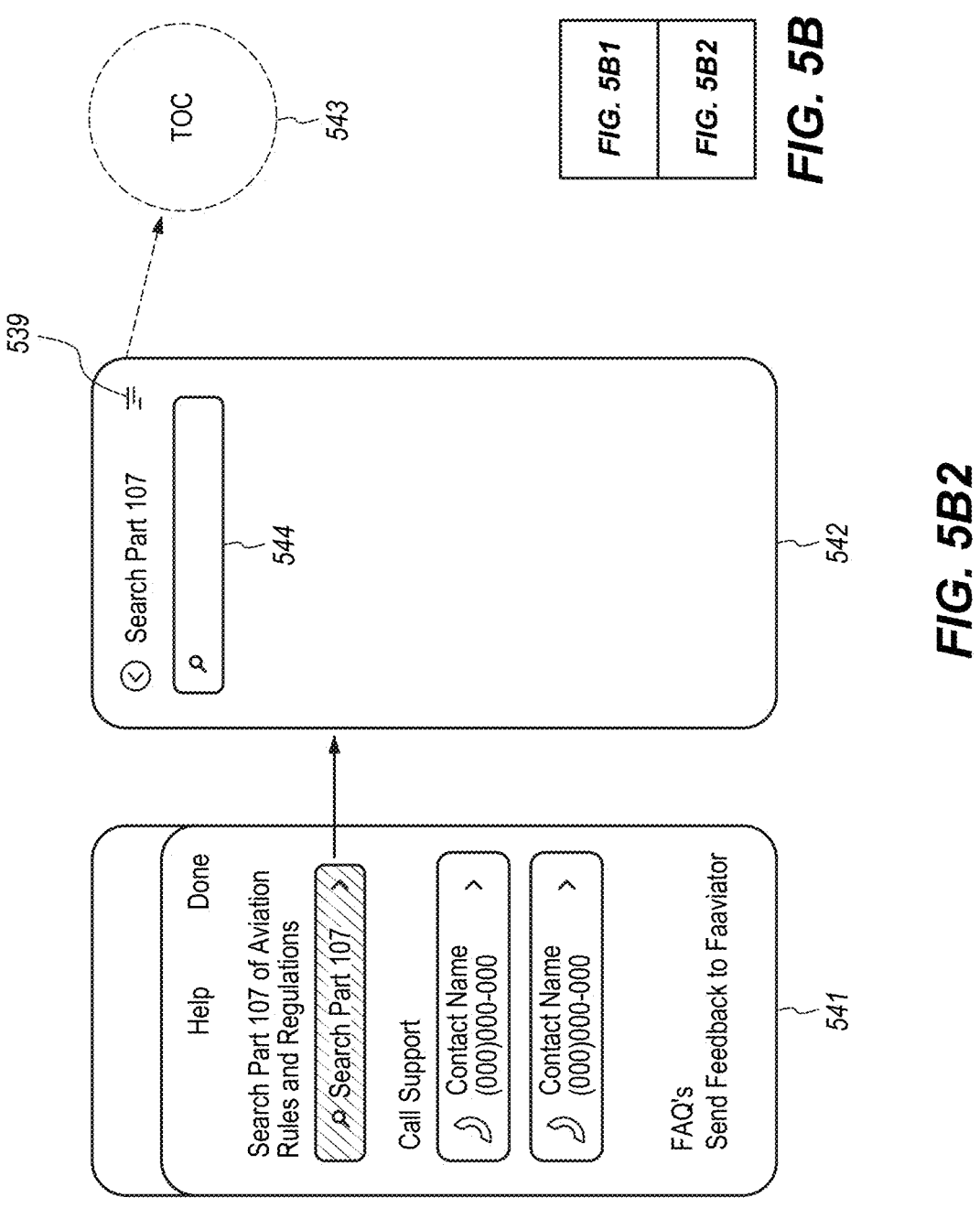
Figure 5C:
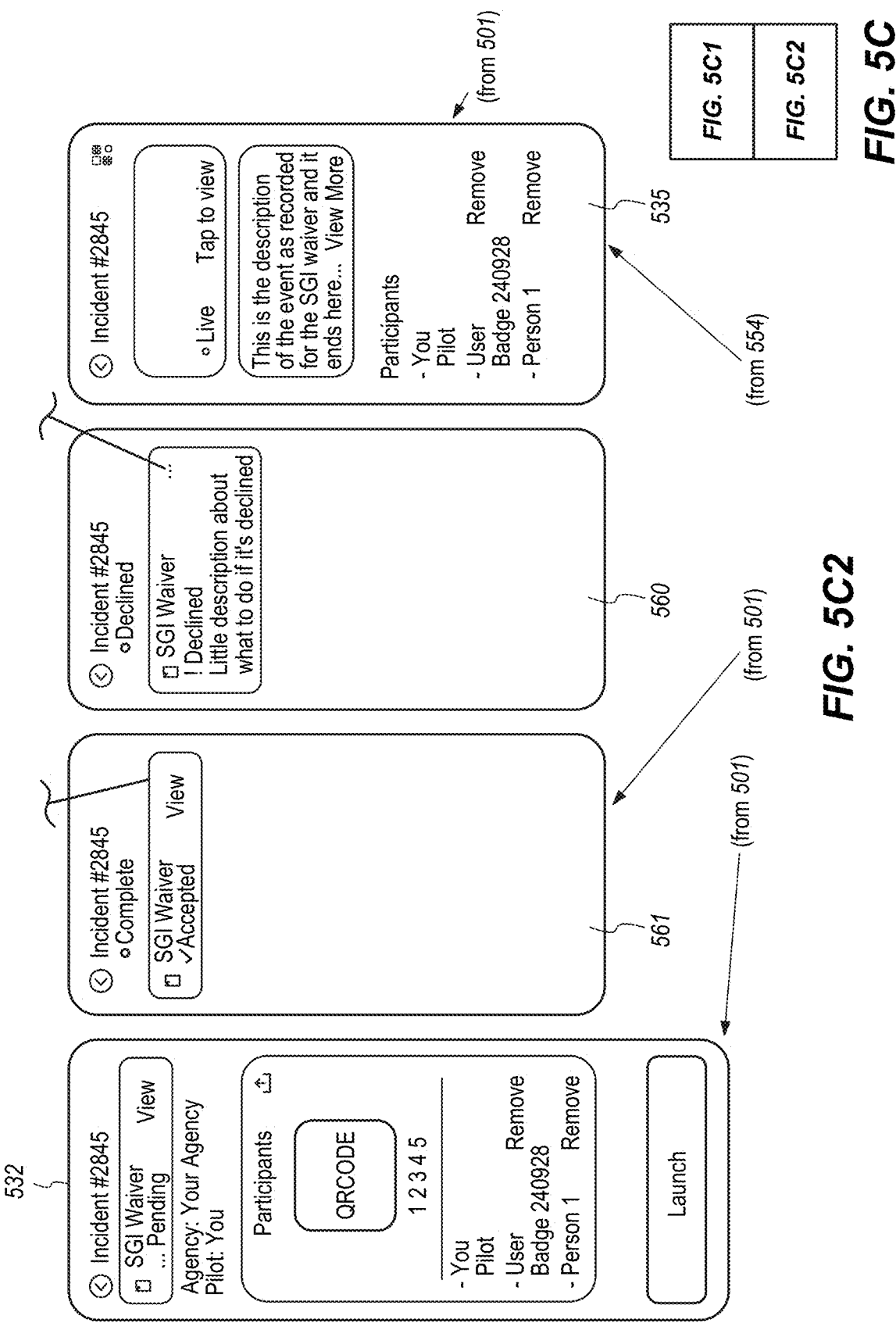
FIGS. 5C through 5G depict examples of additional screens for a user interface for implementing the techniques described herein according to one embodiment, along with an indication of the relationships among the screens.
Figure 5D:
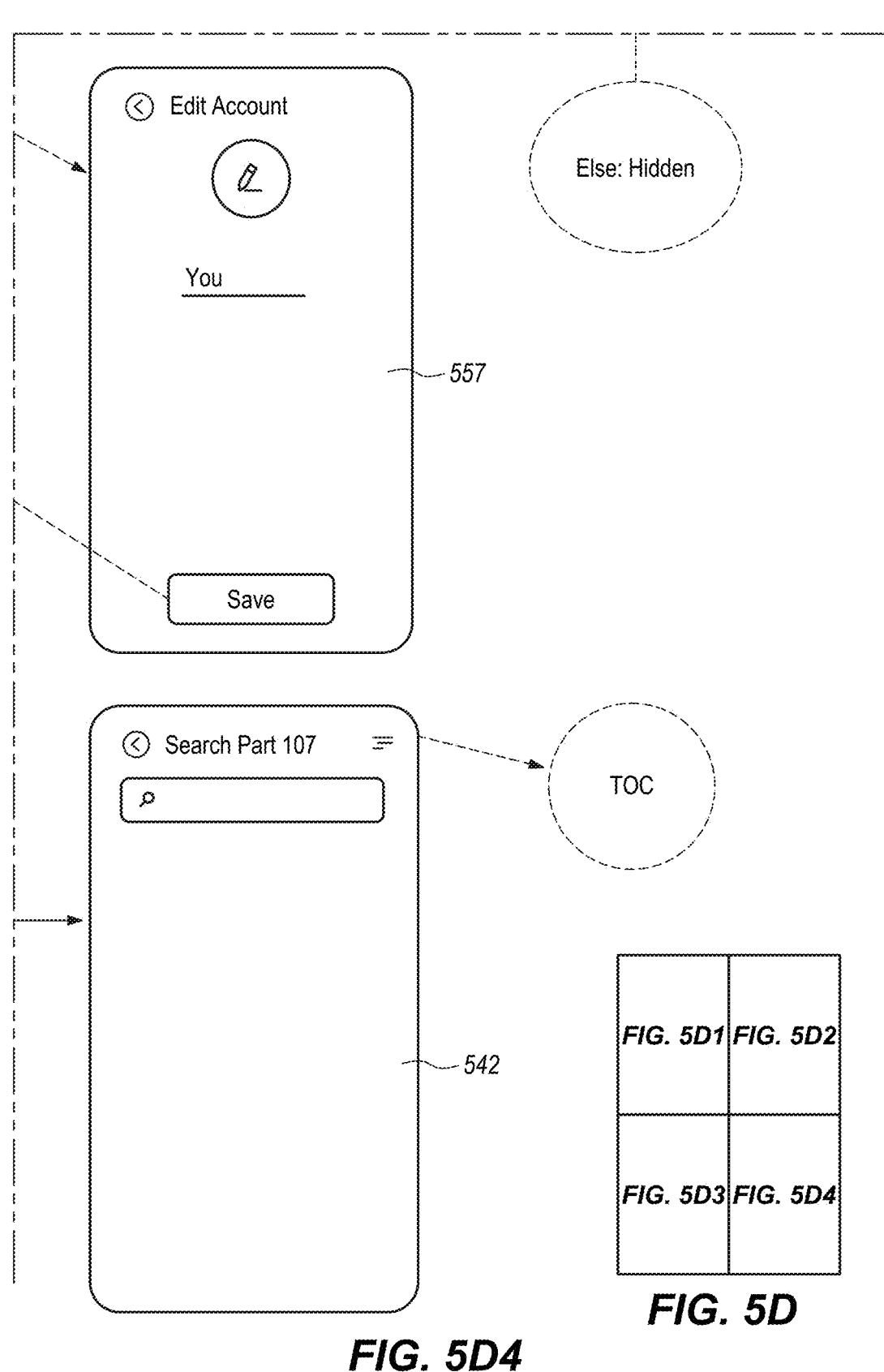
Figure 5E:
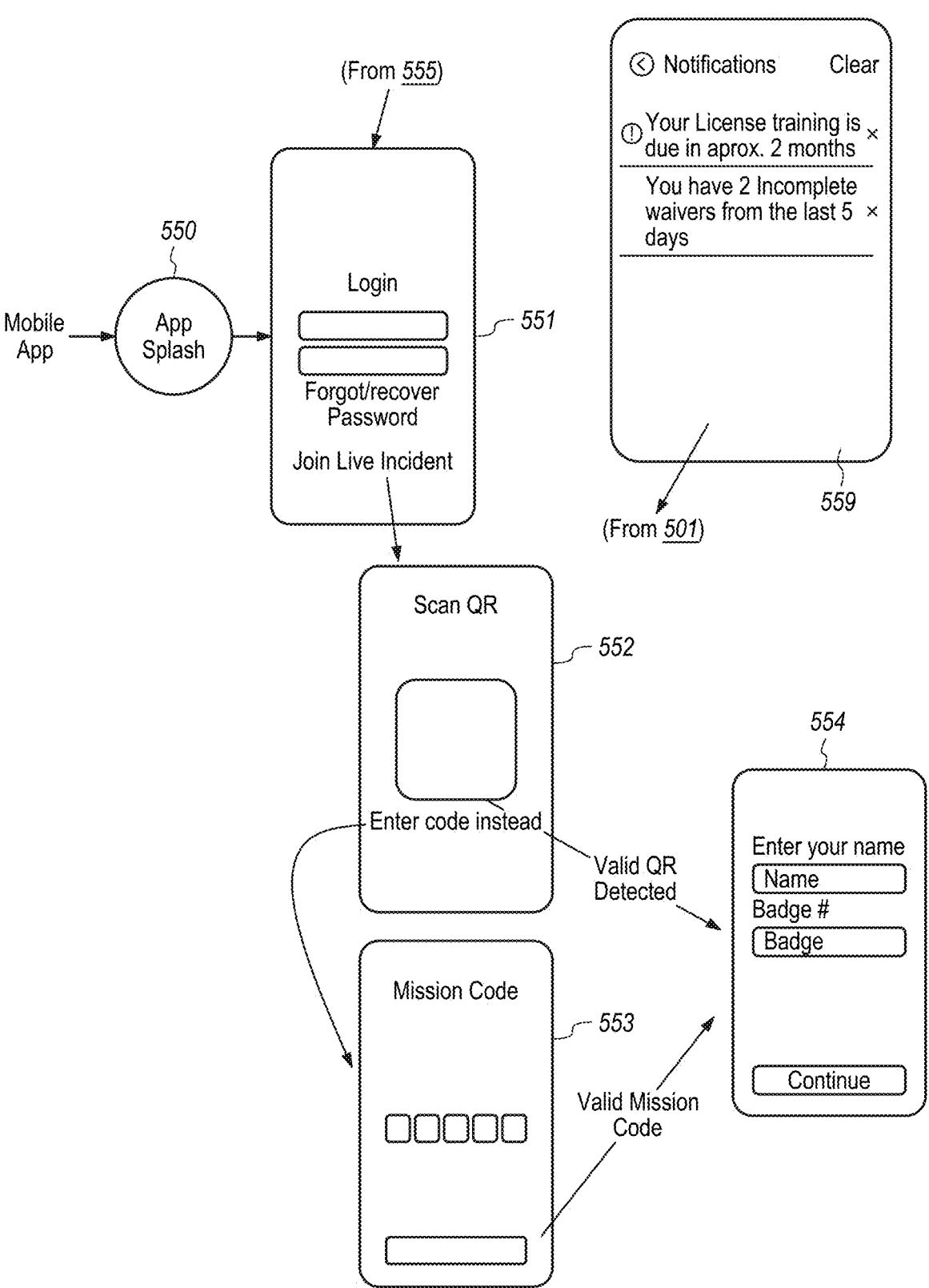
Figure 5F:
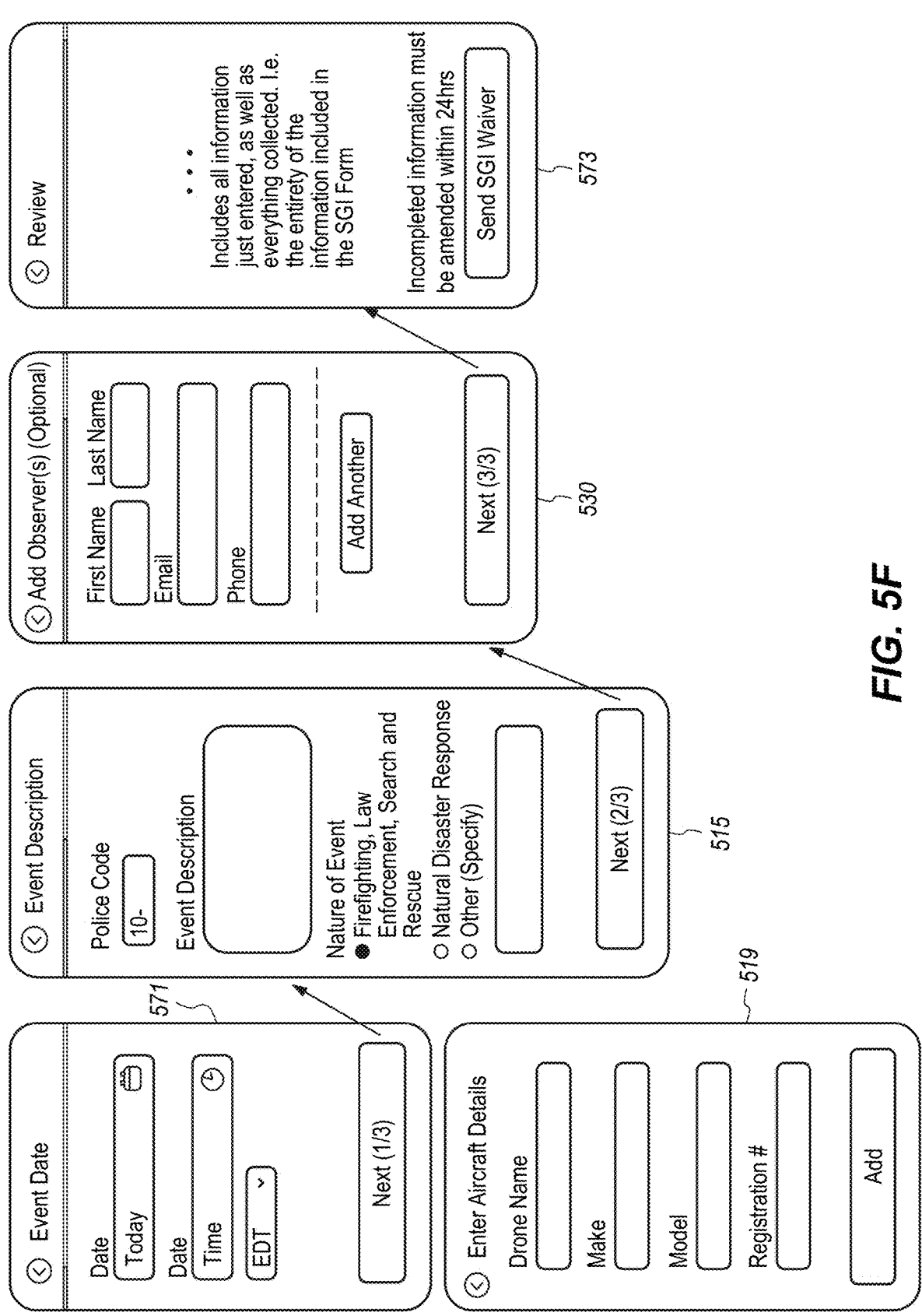
Figure 5G:
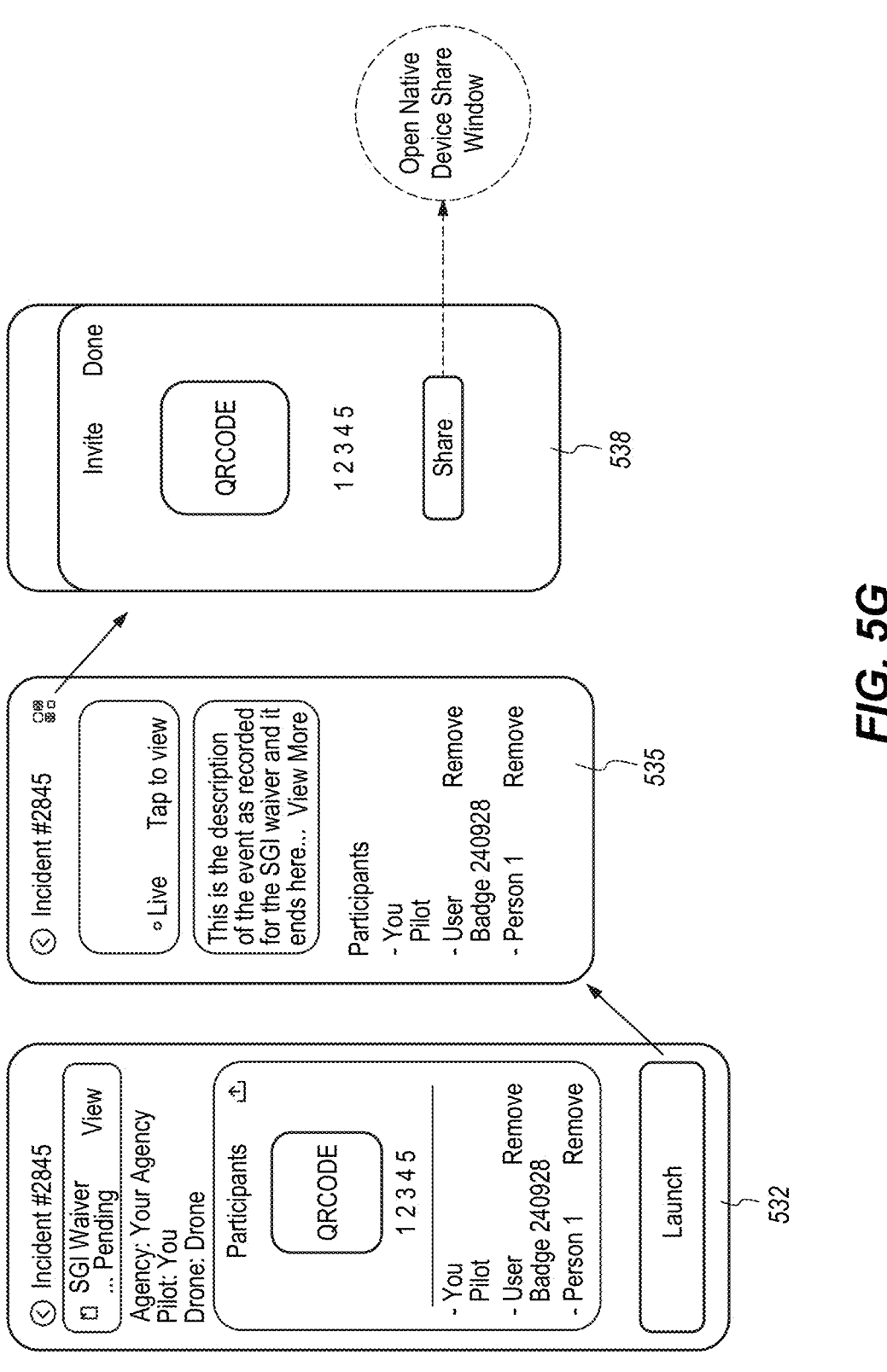
Figure 6A:
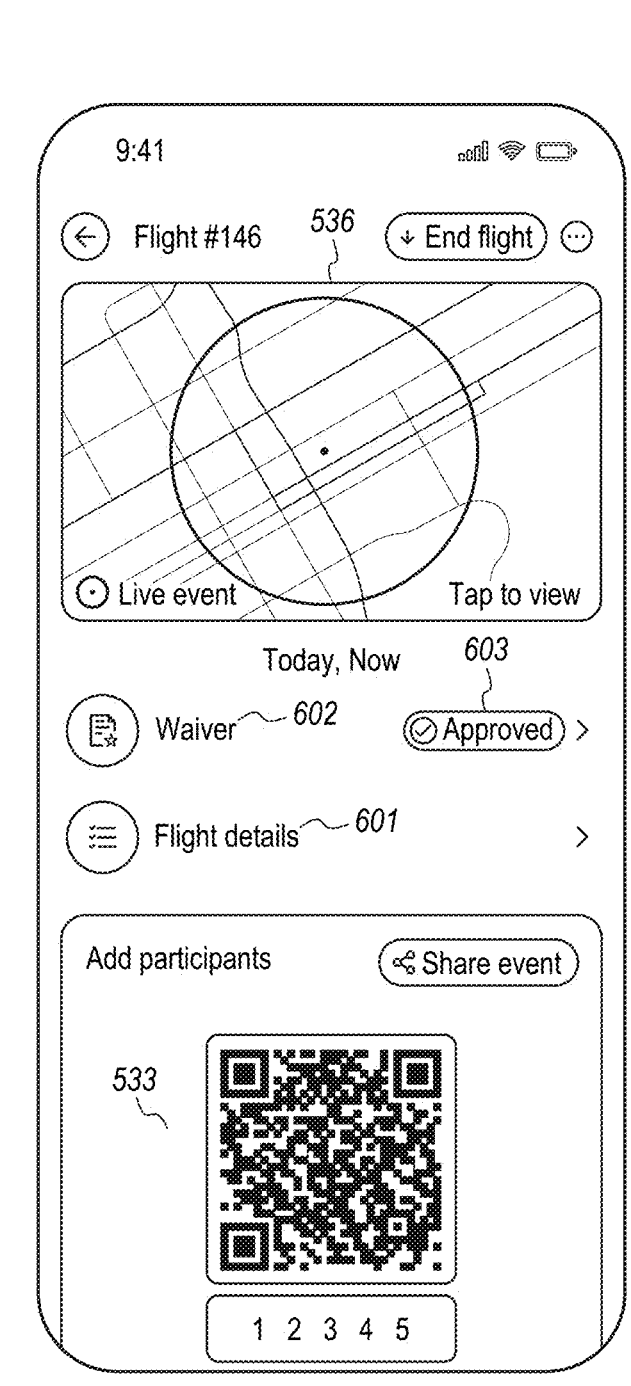
Figure 6D:
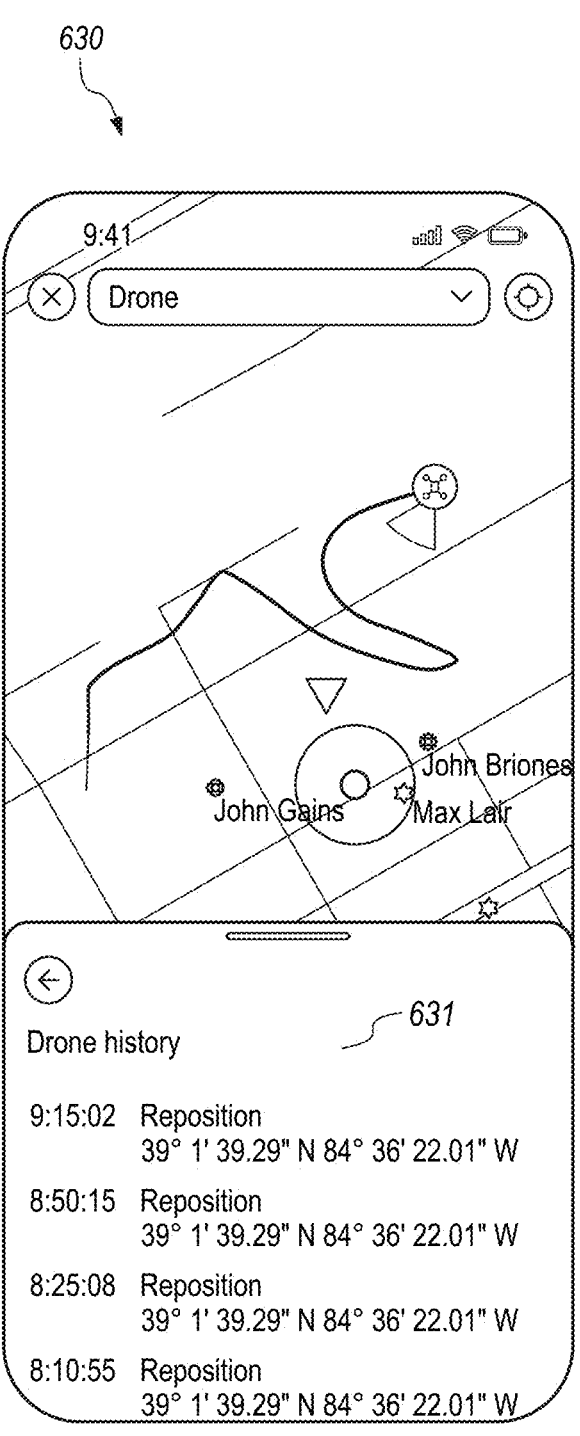

Referring now to FIGS. 5A and 5B, there are shown examples of screens for a user interface for implementing the techniques described herein according to one embodiment. The user interface depicted in the Figures represents the appearance of the user interface on a cell phone or similar device. However, one skilled in the art will recognize that such depictions are merely exemplary, and that other layouts and arrangements are possible, in particular if the user interface is being presented on other types of devices.

Screen 501 is an example of a dashboard, including activatable buttons for a current (live) event 502, as well as an upcoming ("on-deck") event 503 and an incomplete event 504. User 100 can tap any of these buttons to access these events, check status, provide further information, initiate transmission, modify or complete incomplete waiver applications, edit or delete, and/or perform other actions. User 100 can tap on New incident button 506 to begin entering information for a new incident.

Screen 507 depicts an example of an interface for specifying the location of the incident. As described above, the system may use GPS functionality to determine the current location of device 100, or user 100 can enter information manually. Button 508 may allow user 100 to change the currently determined location. Interface element 509 may allow user 100 to specify a location and/or radius with respect to a displayed map. Slider 510 may allow user to specify a radius for the mission.

Screen 511 depicts an example of an interface for specifying flight details. A radius preview 512 may be shown. Field 513 may allow user 100 to specify a requested altitude for the flight. Menu 514 may allow user 100 to specify particulars for the drone aircraft, for example from menu entries 520. Screen 519 may allow user 100 to enter aircraft details.

Screen 515 depicts an example of an interface for specifying details of the event or incident. Field 516 may allow user 100 to specify a 10-code (police code). Field 517 may allow user 100 to type an event description. Buttons 518 may allow user 100 to indicate the nature of the event.

Screen 530 depicts an example of an interface for optionally adding observers. Several fields may be included for specifying first name, last name, email address, and phone number for the observer. Button 545 may be provided to allow user 100 to add another observer.

Screen 532 depicts an example of an interface for specifying details about the incident, as described above, including for example an agency, pilot information, and/or drone information. QR code 533 may be provided, which may be shared with other individuals to allow them access to information about the incident and/or drone, as well as to a live drone video feed, as described above. Fields 534 may display information about the various participants.

Screen 535 depicts an example of an interface for viewing details about the incident, including live view 536 and list 537 of participants.

Screen 538 depicts an example of an interface for displaying an invite to view information about the incident and/or drone, including QR Code 533 that may be shared using Share button 540.

Screen 541 depicts an example of an interface for displaying Help information that may be relevant in connection with the incident and/or drone. Screen 541 may allow user 100 to search Part 107 of Aviation Rules and Regulations, and/or other relevant information. Buttons may also be provided to allow user to call support staff, view FAQs, send feedback, and/or the like.

Screen 542 depicts an example of an interface for searching Part 107 of Aviation Rules and Regulations, and/or other relevant information. Field 544 may allow user 100 to enter text for a search.

In at least one embodiment, Table of Contents 543 may be displayed, for example in response to user 100 tapping on button 539.

Referring now to FIGS. 5C through 5G, there are shown examples of additional screens for a user interface for implementing the techniques described herein according to one embodiment, along with an indication of the relationships among the screens.

Screen 550 depicts an example of an app splash screen that may be displayed upon startup.

Screen 551 depicts an example of a login screen, including fields for entering login and password, and a button for joining a live incident.

Screen 552 depicts an example of an interface for joining a live incident, either by scanning a QR code that has been shared by another user, or by entering information (such as a numeric mission code) manually.

Screen 553 depicts an example of an interface for entering a mission code manually.

Screen 554 depicts an example of an interface that may be displayed after a valid QR Code is detected or a mission code is entered manually. User 100 may be prompted to enter a name and badge number.

Screen 555 depicts an example of an interface for navigating to various screens.

Screen 556 depicts an example of an interface for viewing and/or changing account details, as may be displayed in response to user 100 selecting the Profile option in screen 555. Screen 557 depicts an example of an interface for editing user's 100 account.

Screens 541 and 542, described above, may be displayed in response to user 100 selecting the Help option in screen 555.

Screen 558 depicts an example of an interface for managing user's 100 aircraft, as may be displayed in response to user 100 selecting the Aircraft Manager option in screen 555. In at least one embodiment, screen 558 may provide access to Aircraft Details screen 519, which is described in more detail above.

Screens 501, 507, and 511, described above, may be displayed in response to user 100 selecting the Dashboard option in screen 555. Screen 559 depicts an example of an interface for managing notifications.

In at least one embodiment, screen 535, described above, may be displayed in response to user 100 selecting a live incident/event from screen 501. Screen 532, described above, may be displayed in response to user 100 selecting a future ("on-deck") incident/event.

Screen 561 depicts an example of an interface for displaying an accepted waiver request. User 100 can tap on a View button to activate screen 562, which may display additional information about the waiver.

Screen 560 depicts an example of an interface for displaying a declined waiver request. User 100 can tap on the three dots to activate menu 564, allowing user 100 to view and/or amend the application, via screen 563.

Screen 571 depicts an example of an interface for entering the date of the event or incident.

Screen 519 depicts an example of an interface for entering aircraft details, as described above.

Screen 515 depicts an example of an interface for entering a description of the event or incident, as described above.

Screen 530 depicts an example of an interface for optionally adding observers, as described above.

Screen 573 depicts an example of an interface for final review before the waiver request is sent.

Screen 532 depicts an example of an interface for specifying details about the incident, as described above, including for example an agency, pilot information, and/or drone information.

Screen 535 depicts an example of an interface for viewing details about the incident, as described above.

Screen 538 depicts an example of an interface for displaying an invite to view information about the incident and/or drone, as described above.

Referring now to FIGS. 6A through 6D, there are shown examples of additional screens for a user interface for implementing the techniques described herein according to one embodiment.

Screen 600 is an example of an app screen including live view 536 of the incident, along with link 602 to the waiver, and current approval status 603. User 100 can click on flight details link 601 to see more details. QR code 533 may be provided, which may be shared with other individuals to allow them access to information about the incident and/or drone, as well as to a live drone video feed, as described above.

Screens 610 and 620 depict examples of light and dark mode (of the same screen) during an incident mission. Again, live view 536 is shown, including current drone position 614 and tail 613 depicting the drone path. In at least one embodiment, tail 613 may be depicted on live view 536 and/or on the incident map. Also shown is current position 615 of user 100 or first responder. Also shown is focus data 611 about user 100 or first responder, and link 612 to drone position data.

Screen 630 depicts an example of an app screen including drone history 631, which may be displayed after user 100 activation of link 612.

Artificial Intelligence

In at least one embodiment, the system may employ artificial intelligence and/or machine learning in any of a number of different ways, either singly or in any suitable combination. Examples include:

to improve the search for identifying information for the pilot's Remote Pilot Certificate (under FAA Small UAS Rule Part 107);

to improve the calculation of distance from the nearest airport;

to provide additional analysis of the live incident;

to help fill out waiver requests via speech recognition and conversational querying, or via an app and/or software provided to the FAA or using an API.

For example, in at least one embodiment, user 100 can submit a waiver request by speaking into their phone, the AI system can ask them questions as needed, and the system may then fill out the waiver request form based on the spoken information from user 100. The system may then use speech generation to communicate the request to the FAA SOSC over the phone.

Additional Functionality

In various embodiments, the described system may include additional functionality to improve the efficiency with which waiver requests are received and handled, such as the following:

In at least one embodiment, the system may automatically and periodically check for any updates or changes to the FAA UAS waiver form or process; if any are made, appropriate changes may automatically be made in the app, and end users may be automatically notified.

In at least one embodiment, a "Help" button may be provided that provides access to a searchable Part 107 form in its entirety describing small UAS rules for operation, registration, certification, and operation over human beings.

In at least one embodiment, the system may enforce a certain sequence in which the relevant information is to be provided, and may require that all relevant information be provided. For example, in at least one embodiment, flight details for the planned drone flight cannot be submitted until all mandatory fields are completed.

In at least one embodiment, the system may also provide a mechanism for contacting the FAA and/or the company running the system, for example, via email, message, intranet, and/or phone.

In at least one embodiment, the system may provide auto-fill of information that is available to device 108 on which the app is running. This can include, for example, information entered in connection with previous waiver requests, current location including address information (obtained, for example via GPS functionality), date and time, and/or the like.

In various embodiments, any suitable input mechanism (or combination of mechanisms) may be provided for collecting relevant information for the waiver request. For example, in at least one embodiment, a menu may be provided for the class of airspace involved based on the incident location. Similarly, other input mechanisms may be provided for other relevant information to be collected.

In at least one embodiment, the system may also integrate functionality for downloading, uploading, and/or transmitting recorded drone video and/or images as needed or appropriate. For example, video and/or images may be downloaded to the user's cell phone and/or other device. The file or record for the drone waiver request may be associated with or linked to the downloaded video and/or images. In this manner, once the FAA has provided approval for the waiver request, such approval may be linked to the content collected during the drone flight and recorded/saved for future case review, litigation, FAA logging review, and/or compliance.

In at least one embodiment, all interactions, including waiver requests and/or approvals, may be time-stamped.

In at least one embodiment, the system may include, within the app, a mechanism to report drone accident and/or incident reports to the FAA and/or to other relevant authorities. Such reporting may take place automatically, or under user 100 direction. Appropriate information may be automatically collected when such reports are to be sent. Any suitable mechanism may be used for transmitting such reports, such as for example secure electronic transmission, instant messaging, e-mail, texting, and/or the like, and such messages may be sent automatically.

In at least one embodiment, the system may include, within the app, a mechanism for user 100 to transmit, to the FAA and/or to other relevant authorities, a name change or address change.

In at least one embodiment, the app may include functionality allowing user 100 to specify the area of flight of drone 303, for example by circling the area of flight. In addition, in at least one embodiment, a slide bar may be provided to allow user 100 to increase or decrease the radius circle indicator on the map according to the live emergency event's needs.

In at least one embodiment, the app may include functionality to present a live video feed from drone 303. The live video feed may be shown, for example, as a split-screen with other components of the user interface such as an incident map. The live video feed may include, for example, drone camera footage overlooking the scene. In at least one embodiment, body camera feeds may be integrated into the live video feed. In at least one embodiment, "view only" access may be provided to allow spectators (e.g., non-pilots) to view footage from the live video feed.

In at least one embodiment, the system can be configured to automatically prompt user 100 to renew expiring licenses. For example, at some period before (or after) a pilot's license expires, such as one month before or day after expiration, the system can automatically send a reminder (via email, alert, messaging, and/or the like) to the manager and pilot to renew the pilot's license. Reminders can be configured to be sent at any suitable time, such as for example 3, 2 and 1 month before expiry. In at least one embodiment, if user 100 renews the license, further reminder emails can be canceled automatically.

In at least one embodiment, the system may use the FAA Aeronautical Data and/or Information Management (AIM) API (Application Programming Interface) to provide and/or obtain aeronautical data to acquire airspace classes, flyable drone altitude near airport, aeronautical data, airport information, and/or lists of airports near a set of GPS coordinates. APIs may be used to access sources such as OpenSky, FlightAware, and/or FlightRadar24 to obtain information for identifying aircraft, their altitude, speed, and/or other information. Such information may include airspace classes that may be used to indicate what airspace the drone will fly in. The FAA's Special Government Interest (SGI) Waiver API may also be used for submission of waiver requests using the techniques described herein.

In at least one embodiment, additional functionality may be provided, enabling the FAA or other administrative agencies to interface with and/or communicate with the app described herein. Such functionality may be provided, for example, via a secondary app or by additional functionality within the primary app. Such an approach may obviate the need to use an API to allow communication between the FAA and the waiver requester. Waiver requests may be transmitted to the FAA or other relevant agencies via secure communication between the apps.

In at least one embodiment, the system may provide a selectable way to determine and identify the altitude and/or location of other on-site drones and/or other aircraft in the area (such as, for example, fire, police, rescue helicopter) or on the scene of the incident. Such a mechanism may assist in avoiding interference or collisions.

In at least one embodiment, the system may provide the ability for an alternative person, such as an offsite dispatcher, commander, or program manager to submit the waiver request, for example if the first responder is out of cellular range or otherwise unable to submit it.

In at least one embodiment, the system may provide the ability to upload video (such as drone footage) to cloud-based storage and/or local storage with a timeline stamp. Such timeline stamps may be used for any video, incident map, interactions, and/or submissions to/from FAA and/or other entities.

In at least one embodiment, various selectable overlays may be provided in connection with the incident map, allowing for additional information to be graphically depicted on such map. Such overlays may include, for example, no-fly or altitude restriction zones, airspace class, incidents, elevation/terrain, topography, fire, jurisdiction lines, weather, population density, past incidents, and/or the like.

In at least one embodiment, functionality to implement a drone aircraft inventory manager may be provided, including features to check out aircraft and maintain real-time inventory. Thus, if a drone aircraft has been checked out, it may be unavailable for others.

In at least one embodiment, the system may include functionally to project the live video feed and/or incident map to an external monitor, display, television, tablet, or other device, for example via screen mirroring technology such as Airplay, Screen Mirror, or Chromecast.

In at least one embodiment, the system may interface with personal digital assistants such as Siri or Google Now. The system described herein may be activated via such assistants, which may authenticate user 100 via facial ID or other techniques, and may automatically start the AI conversation to complete the waiver request form.

Thus, for example, an activation command such as "Hey Siri" may cause the app to open, and an artificial intelligence module may ask for the unfilled/needed mandatory entries. The system may then proceed directly to review and select changes or additions to the information, before submitting.

In at least one embodiment, the system may be able to automatically fly drone 303 and record video from the drone's camera(s).

In at least one embodiment, the system may include functionality to submit an accident report to the FAA and/or other relevant authorities within a specified period of time (such as, for example, 10 days) if drone 303 is involved in an accident causing at least a threshold amount of damage (such as, for example, $500).

In at least one embodiment, the system may provide functionality to submit other regulatory forms, such as for example, approvals for Low Altitude Authorization and Notification Capability (LAANC). Such submissions may take place, for example, using the FAA website (api.faa.gov). In addition, the system may provide functionality for assisting in submitting Certificates of Waiver or Authorization (COA) to the FAA for approval, which may be a separate process from the drone request waiver. In addition, the system may handle submission of a Public Safety Organization Shielded Operations Waiver and/or Wide Area Authorization (WAA).

In at least one embodiment, the system may maintain a tally/count of successfully submitted waivers.

In at least one embodiment, the system may including, in the waiver form email submission to the FAA an indication that the email was automatically generated by the described system. An indication of source may be included.

In at least one embodiment, the system may include functionality to identify drone 303 from a plurality of available drones, either manually, via artificial intelligence, or via selection in a dropdown menu. In at least one embodiment, drone nicknames may be applied and used.

In at least one embodiment, all relevant data is saved and/or recorded, and made available as needed by other entities. Any suitable repository may be used for saving such data, such as AirData or other video storage service to link first responder report/case number, LAANC, COA, SGI, temporary flight restrictions (TFRs), drone maintenance or battery logs, and/or the like. These records may be linked together for audit/inspection/compliance requests from administrators of FAA or NTSB representatives. In at least one embodiment, the system may also track who changed what at what time, on the waiver form, and may provide a maintenance checklist and record-keeping ability.

In at least one embodiment, a new field entry of Police/Fire report number may be provided for the first responder to enter, to enable linking to other first responder storage providers. This report number may be automatically acquired through the software/system(s) associated with the other providers.

In at least one embodiment, email requests sent by the system to the FAA may be stamped with an identifier of source, for example to indicate that the email request was automatically generated by the system described herein.

The above-described method sets forth a number of steps by which the described system can automate, simplify, and complete FAA waiver request forms in a streamlined manner, so as to improve the efficiency with which waiver approval can take place, particularly during emergencies.

Although the system and method are described in terms of FAA licensing and waivers, in at least one embodiment, the system can also be configured to be usable in other jurisdictions, such as those outside the US. In such cases, waiver request forms may be sent to appropriate authorities in such jurisdictions. In at least one embodiment, the app may be configured to function in different languages depending on localization requirements.

The Figures and accompanying description are intended to be illustrative of one or more embodiments by which the system and method may be implemented. However, one skilled in the art will recognize that the system may be implemented using different components than depicted and described herein, and using steps that differ from those depicted and described herein. Accordingly, the system and method depicted and described in the Figures and accompanying description are merely exemplary.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. In addition, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments may be included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It may be convenient at times, principally for reasons of common usage, to refer to these signals as bits, values, elements, symbols, characters, terms, numbers, or the like. Furthermore, it may also be convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it may be appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions may be embodied in software, firmware and/or hardware, and when embodied in software, may be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device may include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Washington; MacOS, available from Apple Inc. of Cupertino, California; iOS, available from Apple Inc. of Cupertino, California; Android, available from Google, Inc. of Mountain View, California; and/or any other operating system that may be adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A computer-implemented method for automatically processing a waiver request for drone operation in connection with an ongoing incident, comprising:

receiving, via an input device, a request from a user to initiate a waiver request for drone operation by a drone operator in a geographic area associated with the incident;

collecting data for the waiver request;

automatically validating the collected data;

receiving, via the input device, input from the user to proceed with transmission of the request;

automatically and electronically transmitting the request to an agency for processing;

receiving, via electronic means, a response to the request; and displaying the response via an output device.

2. The method of claim 1, wherein the agency comprises a government agency.

3. The method of claim 1, further comprising:

receiving, via wireless transmission means, a signal from the drone; and displaying, via the output device, a live video feed based on the signal received from the drone.

4. The method of claim 3, further comprising:

displaying, via the output device and concurrently with the display of the live video feed, an interactive map depicting the geographic area associated with the incident; and displaying, on the interactive map, current locations of persons addressing the incident.

5. The method of claim 4, wherein displaying the live video feed and the interactive map comprise displaying a split screen depicting the live video feed in a first area of the output device and the interactive map in a second area of the output device.

6. The method of claim 3, further comprising:

displaying, on the output device, a QR code to enable access to at least one of the live video feed and the interactive map by another device; and responsive to another device scanning the QR code, providing at least one of the live video feed and the interactive map to the other device.

7. The method of claim 1, further comprising:

displaying, via the output device, an interactive map depicting the geographic area associated with the incident; and displaying, on the interactive map, current locations of persons involved with the incident.

8. The method of claim 7, wherein at least one of the persons comprises a first responder.

9. The method of claim 1, wherein collecting data for the waiver request comprises retrieving previously stored information about the drone operator.

10. The method of claim 1, wherein collecting data for the waiver request comprises:

prompting the user, via the output device, to enter at least one of:

requested flight details (RFD);

a 10-code for the incident; and a selection of at least one incident description from a list of descriptions; and receiving, via the input device, input from the user in response to the prompt.

11. The method of claim 1, wherein collecting data for the waiver request comprises:

obtaining the user's current location via GPS functionality; and determining a location for the incident based on the user's current location.

12. The method of claim 1, wherein collecting data for the waiver request comprises:

displaying an interactive map on the output device;

receiving, via the input device, user input activating a location on the displayed map; and determining a location for the incident based on the activated location on the displayed map.

13. The method of claim 12, wherein collecting data for the waiver request comprises further comprises:

receiving, via the input device, user input indicating a perimeter on the displayed map; and determining an expected flight boundary for the incident based on the user input on the displayed map.

14. The method of claim 1, wherein collecting data for the waiver request comprises:

determining a location for the incident; and automatically determining, based on the determined location, at least one of:

travel distance;

radius of expected flight;

identification of nearest airport to the location;

three-letter identifier for nearest airport;

distance from the nearest airport to the location;

direction from the nearest airport to the location; and class of airspace surrounding the location.

15. The method of claim 1, further comprising:

receiving, via the input device, user input to control the drone; and wirelessly transmitting signals to control the drone based on the received input.

16. The method of claim 1, further comprising, prior to receiving the input from the user to proceed with transmission of the request, outputting, via an audio output device, synthesized speech summarizing the request.

17. A non-transitory computer-readable medium for automatically processing a waiver request for drone operation in connection with an ongoing incident, comprising instructions stored thereon, that when performed by one or more hardware processing devices, perform the steps of:

causing an input device to receive a request from a user to initiate a waiver request for drone operation by a drone operator in a geographic area associated with the incident;

collecting data for the waiver request;

automatically validating the collected data;

causing the input device to receive input from the user to proceed with transmission of the request;

automatically and electronically transmitting the request to an agency for processing;

receiving, via electronic means, a response to the request; and causing an output device to display the response.

18. The non-transitory computer-readable medium of claim 17, wherein the agency comprises a government agency.

19. The non-transitory computer-readable medium of claim 17, further comprising instructions stored thereon, that when performed by one or more hardware processing devices, perform the steps of:

receiving, via wireless transmission means, a signal from the drone; and causing the output device to display a live video feed based on the signal received from the drone.

20. The non-transitory computer-readable medium of claim 19, further comprising instructions stored thereon, that when performed by one or more hardware processing devices, perform the steps of:

causing the output device to display, concurrently with the display of the live video feed, an interactive map depicting the geographic area associated with the incident; and causing the output device to display, on the interactive map, current locations of persons addressing the incident.

21. The non-transitory computer-readable medium of claim 20, wherein causing the output device to display the live video feed and the interactive map comprises causing the output device to display a split screen depicting the live video feed in a first area of the output device and the interactive map in a second area of the output device.

22. The non-transitory computer-readable medium of claim 20, further comprising instructions stored thereon, that when performed by one or more hardware processing devices, perform the steps of:

causing the output device to display a QR code to enable access to at least one of the live video feed and the interactive map by another device; and responsive to another device scanning the QR code, providing at least one of the live video feed and the interactive map to the other device.

23. The non-transitory computer-readable medium of claim 17, further comprising instructions stored thereon, that when performed by one or more hardware processing devices, perform the steps of:

causing the output device to display an interactive map depicting the geographic area associated with the incident; and causing the output device to display, on the interactive map, current locations of persons involved with the incident.

24. The non-transitory computer-readable medium of claim 23, wherein at least one of the persons comprises a first responder.

25. The non-transitory computer-readable medium of claim 17, wherein collecting data for the waiver request comprises retrieving previously stored information about the drone operator.

26. The non-transitory computer-readable medium of claim 17, wherein collecting data for the waiver request comprises:

causing the output device to prompt the user, to enter at least one of:

requested flight details (RFD);

a 10-code for the incident; and a selection of at least one incident description from a list of descriptions; and causing the input device to receive input from the user in response to the prompt.

27. The non-transitory computer-readable medium of claim 17, wherein collecting data for the waiver request comprises:

obtaining the user's current location via GPS functionality; and determining a location for the incident based on the user's current location.

28. The non-transitory computer-readable medium of claim 17, wherein collecting data for the waiver request comprises:

causing the output device to display an interactive map;

causing the input device to receive user input activating a location on the displayed map; and determining a location for the incident based on the activated location on the displayed map.

29. The non-transitory computer-readable medium of claim 28, wherein collecting data for the waiver request comprises further comprises:

causing the input device to receive user input indicating a perimeter on the displayed map; and determining an expected flight boundary for the incident based on the user input on the displayed map.

30. The non-transitory computer-readable medium of claim 17, wherein collecting data for the waiver request comprises:

determining a location for the incident; and automatically determining, based on the determined location, at least one of:

travel distance;

radius of expected flight;

identification of nearest airport to the location;

three-letter identifier for nearest airport;

distance from the nearest airport to the location;

direction from the nearest airport to the location; and class of airspace surrounding the location.

31. The non-transitory computer-readable medium of claim 17, further comprising instructions stored thereon, that when performed by one or more hardware processing devices, perform the steps of:

causing the input device to receive user input to control the drone; and wirelessly transmitting signals to control the drone based on the received input.

32. The non-transitory computer-readable medium of claim 17, further comprising instructions stored thereon, that when performed by one or more hardware processing devices, perform the steps of, prior to receiving the input from the user to proceed with transmission of the request, causing an audio output device to output synthesized speech summarizing the request.

33. A system for automatically processing a waiver request for drone operation in connection with an ongoing incident, comprising:

an input device, adapted to:

receive a request from a user to initiate a waiver request for drone operation by a drone operator in a geographic area associated with the incident; and receive input from the user to proceed with transmission of the request;

a hardware processor, communicatively coupled to the input device, adapted to:

collect data for the waiver request; and automatically validate the collected data;

a wireless electronic transmission component, communicatively coupled to the hardware processor, adapted to:

automatically transmit the request to an agency for processing; and receive a response to the request; and an output device, communicatively coupled to the hardware processor, adapted to display the response.

34. The system of claim 33, wherein the agency comprises a government agency.

35. The system of claim 33, wherein:

the wireless electronic transmission component is further adapted to receive a signal from the drone; and the output device is further adapted to display a live video feed based on the signal received from the drone.

36. The system of claim 35, wherein the output device is further adapted to:

display, concurrently with the display of the live video feed, an interactive map depicting the geographic area associated with the incident; and display, on the interactive map, current locations of persons addressing the incident.

37. The system of claim 36, wherein displaying the live video feed and the interactive map comprise displaying a split screen depicting the live video feed in a first area of the output device and the interactive map in a second area of the output device.

38. The system of claim 35, wherein:

the output device is further adapted to display a QR code to enable access to at least one of the live video feed and the interactive map by another device; and the wireless electronic transmission component is further adapted to, responsive to another device scanning the QR code, provide at least one of the live video feed and the interactive map to the other device.

39. The system of claim 33, wherein:

the output device is further adapted to display an interactive map depicting the geographic area associated with the incident; and the output device is further adapted to display, on the interactive map, current locations of persons involved with the incident.

40. The system of claim 39, wherein at least one of the persons comprises a first responder.

41. The system of claim 33, wherein collecting data for the waiver request comprises retrieving previously stored information about the drone operator.

42. The system of claim 33, wherein collecting data for the waiver request comprises:

causing the output device to prompt the user to enter at least one of:

requested flight details (RFD);

a 10-code for the incident; and a selection of at least one incident description from a list of descriptions; and causing the input device to receive input from the user in response to the prompt.

43. The system of claim 33, further comprising:

a GPS component, communicatively coupled to the hardware processor, adapted to provide the user's current location;

and wherein collecting data for the waiver request comprises determining a location for the incident based on the user's current location provided by the GPS component.

44. The system of claim 33, wherein collecting data for the waiver request comprises:

displaying an interactive map on the output device;

receiving, via the input device, user input activating a location on the displayed map; and determining a location for the incident based on the activated location on the displayed map.

45. The system of claim 44, wherein collecting data for the waiver request comprises further comprises:

causing the input device to receive user input indicating a perimeter on the displayed map; and determining an expected flight boundary for the incident based on the user input on the displayed map.

46. The system of claim 33, wherein collecting data for the waiver request comprises:

determining a location for the incident; and automatically determining, based on the determined location, at least one of:

travel distance;

radius of expected flight;

identification of nearest airport to the location;

three-letter identifier for nearest airport;

distance from the nearest airport to the location;

direction from the nearest airport to the location; and class of airspace surrounding the location.

47. The system of claim 33, wherein:

the input device is further adapted to receive user input to control the drone; and the wireless electronic transmission component is further adapted to wirelessly transmit signals to control the drone based on the received input.

48. The system of claim 33, further comprising:

an audio output device; and a speech synthesis component, communicatively coupled to the hardware processor and to the audio output device, adapted to, prior to receiving the input from the user to proceed with transmission of the request, cause the audio output device to output synthesized speech summarizing the request.

* * * * *